(12) United States Patent
Tsuyumine et al.

(10) Patent No.: US 10,706,891 B2
(45) Date of Patent: Jul. 7, 2020

(54) VIDEO IMAGE PROCESSING APPARATUS AND PROCESSING METHOD

(71) Applicant: SEVEN DEW CO., LTD., Osaka (JP)

(72) Inventors: Hiroshi Tsuyumine, Osaka (JP); Kazuyoshi Kuroki, Osaka (JP)

(73) Assignee: Seven Dew Co., Ltd., Osaka (JP)

( * ) Notice: Subject to any disclaimer, the term of this patent is extended or adjusted under 35 U.S.C. 154(b) by 0 days.

(21) Appl. No.: 15/735,888

(22) PCT Filed: Jul. 14, 2017

(86) PCT No.: PCT/JP2017/025692
§ 371 (c)(1),
(2) Date: Dec. 12, 2017

(87) PCT Pub. No.: WO2018/016435
PCT Pub. Date: Jan. 25, 2018

(65) Prior Publication Data
US 2020/0035271 A1 Jan. 30, 2020

(30) Foreign Application Priority Data

Jul. 22, 2016 (JP) ................................. 2016-144258

(51) Int. Cl.
*G11B 27/34* (2006.01)
*G06K 9/00* (2006.01)
*G11B 27/10* (2006.01)

(52) U.S. Cl.
CPC .......... *G11B 27/34* (2013.01); *G06K 9/00744* (2013.01); *G11B 27/105* (2013.01)

(58) Field of Classification Search
None
See application file for complete search history.

(56) References Cited

U.S. PATENT DOCUMENTS

2010/0281375 A1* 11/2010 Pendergast ........... G11B 27/034
715/723
2016/0353078 A1* 12/2016 Zhou ................... H04N 13/128

FOREIGN PATENT DOCUMENTS

JP 2007-270328 A 3/2004
JP 2006-148397 A 11/2004

OTHER PUBLICATIONS

International Search Report issued in PCT/JP2017/025692, dated Aug. 22, 2017. (Full English Translation).

* cited by examiner

*Primary Examiner* — Eileen M Adams
(74) *Attorney, Agent, or Firm* — McDermott Will & Emery LLP

(57) ABSTRACT

In order to solve a conventional problem that it is not possible to clearly indicate a scene switching point as appropriate, a video image processing apparatus includes: a change information acquiring unit that acquires inter-frame change information, which is information indicating a change between two or more frames, among two or more frames constituting a video image; a point determining unit that, in a case where the inter-frame change information is information indicating a change that is large enough to satisfy a predetermined condition, determines a first point corresponding to the inter-frame change information; and a point output unit that outputs a point in the video image that is the first point determined by the point determining unit, in a visually recognizable manner. Accordingly, it is possible to clearly indicate a scene switching point as appropriate.

10 Claims, 22 Drawing Sheets

| ID | Frame number | Inter-frame change information | Start frame flag | End frame flag |
|---|---|---|---|---|
| 1 | 0 | -1 | 0 | 0 |
| 2 | 1 | 1 | 0 | 0 |
| 3 | 2 | 2 | 0 | 0 |
| 4 | 3 | 7 | 0 | 0 |
| 5 | 4 | 1 | 0 | 0 |
| 6 | 5 | 3 | 0 | 0 |
| 7 | 6 | 9 | 1 | 0 |
| 8 | 7 | 0 | 0 | 0 |
| 9 | 8 | 1 | 0 | 0 |
| ⋮ | ⋮ | ⋮ | ⋮ | ⋮ |
| 509 | 508 | 3 | 0 | 1 |
| ⋮ | ⋮ | ⋮ | ⋮ | ⋮ |
| 2518 | 2517 | 9 | 1 | 0 |
| 2519 | 2518 | 0 | 0 | 0 |
| ⋮ | ⋮ | ⋮ | ⋮ | ⋮ |
| 2917 | 2916 | 2 | 0 | 1 |
| ⋮ | ⋮ | ⋮ | ⋮ | ⋮ |
| 4511 | 4510 | 9 | 1 | 0 |
| 4522 | 4511 | 1 | 0 | 0 |
| ⋮ | ⋮ | ⋮ | ⋮ | ⋮ |
| 5271 | 5272 | 5 | 0 | 1 |
| ⋮ | ⋮ | ⋮ | ⋮ | ⋮ |
| 8321 | 8320 | 1 | 0 | 0 |
| 8322 | 8321 | 9 | 1 | 0 |
| ⋮ | ⋮ | ⋮ | ⋮ | ⋮ |
| 9168 | 9167 | 1 | 0 | 1 |
| ⋮ | ⋮ | ⋮ | ⋮ | ⋮ |

FIG.6

VIDEO IMAGE PROCESSING APPARATUS AND PROCESSING METHOD

TECHNICAL FIELD

The present invention relates to a video image processing apparatus and the like for acquiring inter-frame change information, which is information indicating a change between frames of a video image, and processing the video image using the inter-frame change information.

BACKGROUND ART

Conventionally, there is a digest video image generating apparatus whose object is to provide a new digest video image generation technique for efficiently generating a digest video image containing a scene that is appropriate as a digest scene in a video image and having a length that is within a predetermined period of time (see Patent Document 1).

In this apparatus, one or multiple scene sections that are appropriate as a digest video image and important in terms of a meaning are selected using a given method from an input video image. The value of the time length of the digest video image to be generated is preset and is compared with the total time length of the selected scene sections being important in terms of the meaning. According to the comparison result, scene sections are further added, or on the contrary, partially deleted from previously selected scene sections, thereby defining the digest scene so as to allow the time length of the digest video image to exactly match the preset value, and thus the digest video image is generated.

CITATION LIST

Patent Document

Patent Document 1: JP 2006-148397A

SUMMARY OF INVENTION

Technical Problem

However, according to conventional techniques, it is not possible to clearly indicate a scene switching point as appropriate.

Solution to Problem

A first aspect of the present invention is directed to a video image processing apparatus including: a change information acquiring unit that acquires inter-frame change information, which is information indicating a change between two or more frames, among two or more frames constituting a video image; a point determining unit that, in a case where the inter-frame change information is information indicating a change that is large enough to satisfy a predetermined condition, determines a first point corresponding to the inter-frame change information; and a point output unit that outputs a point in the video image that is the first point determined by the point determining unit, in a visually recognizable manner.

With this configuration, it is possible to clearly indicate a scene switching point as appropriate.

A second aspect of the present invention is directed to the video image processing apparatus according to the first aspect, wherein the change information acquiring unit acquires two or more feature values related to a change between two frames, and acquires inter-frame change information, using the two or more feature values.

With this configuration, it is possible to clearly indicate a scene switching point as appropriate.

A third aspect of the present invention is directed to the video image processing apparatus according to the first or second aspect, further including: an accepting unit that accepts a first selecting condition related to the predetermined condition, wherein the point determining unit determines, in a case where the inter-frame change information is information indicating a change that is large enough to satisfy the first selecting condition, a first point corresponding to the inter-frame change information.

With this configuration, it is possible to dynamically change a scene switching point, and clearly indicate it as appropriate.

A fourth aspect of the present invention is directed to the video image processing apparatus according to the third aspect, wherein the accepting unit accepts selection of one scene from among two or more scenes that are segmented by one or two first points output by the point output unit, and the point output unit outputs display corresponding to one scene corresponding to the selection accepted by the accepting unit, in an emphasized manner, compared with display corresponding to another scene.

With this configuration, it is possible to easily select a scene.

A fifth aspect of the present invention is directed to the video image processing apparatus according to the fourth aspect, further including: a partial video image output unit that outputs a partial video image corresponding to one scene corresponding to the selection accepted by the accepting unit.

With this configuration, it is possible to output a partial video image corresponding a selected scene.

A sixth aspect of the present invention is directed to a video image processing apparatus including: a change information acquiring unit that acquires inter-frame change information, which is information indicating a change between two or more frames, among two or more frames constituting a video image; a point determining unit that, in a case where the inter-frame change information is information indicating a change that is large enough to satisfy a predetermined condition, determines a first point corresponding to the inter-frame change information; and a partial video image output unit that simultaneously reproduces two or more partial video images respectively corresponding to scenes that are segmented by one or two first points, on divided screens, which are regions divided in a screen.

With this configuration, it is possible to simultaneously reproduce partial video images respectively corresponding to two or more scenes.

A seventh aspect of the present invention is directed to the video image processing apparatus according to the sixth aspect, further including: an accepting unit that accepts a first selecting condition related to the predetermined condition, wherein the point determining unit determines, in a case where the inter-frame change information is information indicating a change that is large enough to satisfy the first selecting condition, a first point corresponding to the inter-frame change information, and the partial video image output unit determines the number of divided screens according to the number of scenes corresponding to the number of the first points, and simultaneously reproduces two or more partial video images respectively corresponding to all scenes that are segmented by one or two first points, on divided screens in a number that matches the number of divided screens.

With this configuration, it is possible to divide a video image into scenes corresponding to an input condition, and simultaneously reproduce partial video images corresponding to all scenes.

An eighth aspect of the present invention is directed to the video image processing apparatus according to the seventh aspect, wherein the accepting unit accepts selection of one partial video image from among two or more partial video images that are output by the partial video image output unit, and the partial video image output unit outputs a divided screen corresponding to one partial video image corresponding to the selection accepted by the accepting unit, in an emphasized manner, compared with a divided screen corresponding to another partial video image.

With this configuration, it is possible to clearly indicate a selected partial video image.

A ninth aspect of the present invention is directed to the video image processing apparatus according to any one of the first to eighth aspects, further including: a partial video image acquiring unit that acquires one or at least two partial video images corresponding to accepted selection of a scene or a partial video image; and an accumulating unit that accumulates a digest video image having one or more partial video images acquired by the partial video image acquiring unit.

With this configuration, it is possible to easily acquire a digest video image.

A tenth aspect of the present invention is directed to a digest video image acquiring apparatus including: a change information acquiring unit that acquires inter-frame change information, which is information indicating a change between two or more frames, among two or more frames constituting a video image; a partial video image acquiring unit that acquires one or at least two partial video images, each of which is part of a video image, using the inter-frame change information; and an accumulating unit that accumulates a digest video image having one or more partial video images acquired by the partial video image acquiring unit.

With this configuration, a digest video image is acquired using the inter-frame change information indicating a change between frames, and thus it is possible to acquire an appropriate digest video image.

An eleventh aspect of the present invention is directed to the digest video image acquiring apparatus according to the tenth aspect, wherein the partial video image acquiring unit acquires, in a case where the inter-frame change information is information indicating a change that is large enough to satisfy a predetermined condition, one or more partial video images containing a frame corresponding to the inter-frame change information.

With this configuration, it is possible to acquire an appropriate digest video image.

A twelfth aspect of the present invention is directed to the digest video image acquiring apparatus according to the tenth or eleventh aspect, wherein the change information acquiring unit acquires two or more feature values related to a change between two frames, and acquires inter-frame change information, using the two or more feature values.

With this configuration, it is possible to acquire an appropriate digest video image.

A thirteenth aspect of the present invention is directed to the digest video image acquiring apparatus according to any one of the tenth to twelfth aspects, further including: an accepting unit that accepts a partial video image number, which is the number of partial video images, wherein the partial video image acquiring unit acquires partial video images in a number that matches the partial video image number.

With this configuration, it is possible to acquire an appropriate digest video image.

A fourteenth aspect of the present invention is directed to the digest video image acquiring apparatus according to any one of the tenth to twelfth aspects, further including: a selecting condition storage unit in which a first selecting condition for selecting a start frame of a partial video image is stored, wherein the partial video image acquiring unit includes: a frame selecting part that selects one or more frames that match the first selecting condition; and a partial video image acquiring part that acquires one or more partial video images in which one or more frames selected by the frame selecting part are respectively taken as start frames.

With this configuration, it is possible to acquire an appropriate digest video image.

A fifteenth aspect of the present invention is directed to the digest video image acquiring apparatus according to the fourteenth aspect, wherein the partial video image acquiring part acquires a partial video image with a length according to a scene length, from each of two or more scenes from the start frame to a next start frame or an end frame of the video image.

With this configuration, it is possible to acquire an appropriate digest video image.

A sixteenth aspect of the present invention is directed to the digest video image acquiring apparatus according to the fourteenth aspect, wherein the partial video image acquiring part acquires a partial video image with a certain length, from each of two or more scenes from the start frame to a next start frame or an end frame of the video image.

With this configuration, it is possible to acquire an appropriate digest video image.

A seventeenth aspect of the present invention is directed to the digest video image acquiring apparatus according to any one of the fourteenth to sixteenth aspects, wherein, in the selecting condition storage unit, a second selecting condition for selecting an end frame of a partial video image is further stored, and the partial video image acquiring part selects one or more frames that match the second selecting condition, and acquires a partial video image from the start frame to the selected end frame.

With this configuration, it is possible to acquire an appropriate digest video image.

Advantageous Effects of Invention

With the video image processing apparatus according to the present invention, it is possible to clearly indicate a scene switching point as appropriate.

BRIEF DESCRIPTION OF DRAWINGS

FIG. 6 is an inter-frame change information management table in the embodiment.

DESCRIPTION OF EMBODIMENT

Figure 1:
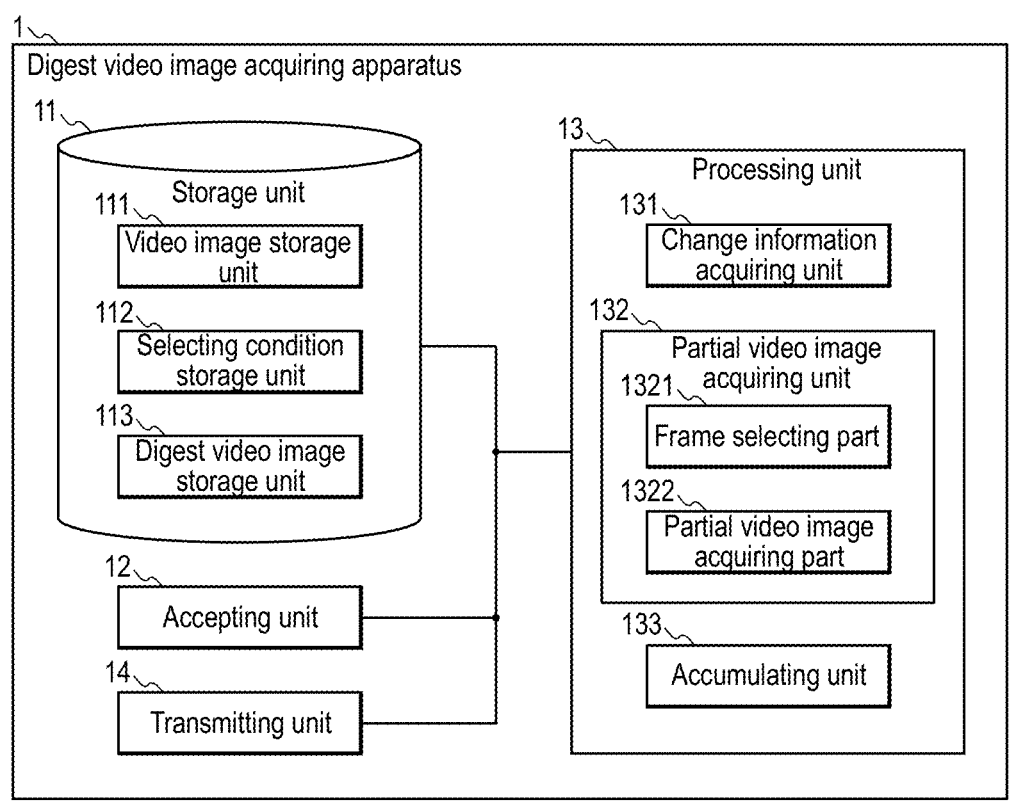
FIG. 1 is a block diagram of a digest video image acquiring apparatus 1 in Embodiment 1.

Hereinafter, embodiments of a digest video image acquiring apparatus, a video image processing apparatus, and the like will be described with reference to the drawings. It should be noted that constituent elements denoted by the same reference numerals in the embodiments perform similar operations, and thus a description thereof may not be repeated.

Embodiment 1

In this embodiment, a digest video image acquiring apparatus will be described that acquires inter-frame change information, which is information indicating a change between frames of a video image, and acquires a digest video image constituted by part of the video image, using the inter-frame change information.

Furthermore, in this embodiment, a digest video image acquiring apparatus will be described that acquires part of a video image using, as a scene start frame, a frame at which the inter-frame change information corresponds to information indicating a change that is large enough to satisfy a predetermined condition, and acquires a digest video image containing the part of the video image.

Furthermore, in this embodiment, a digest video image acquiring apparatus will be described that acquires, for each pair of frames, one piece of inter-frame change information from two or more feature values related to a change between frames, and acquires part of a video image constituted by part of a video image using the inter-frame change information.

Furthermore, in this embodiment, a digest video image acquiring apparatus will be described that accepts a division number N (N is a natural number of 2 or more) for a video image, detects scenes in a number that matches the division number N, acquires partial video images respectively for the two or more scenes, and acquires a digest video image by linking the two or more partial video images.

Furthermore, in this embodiment, a digest video image acquiring apparatus will be described that acquires part of a video image using, as a scene start frame, a frame that matches a predetermined condition, and acquires a digest video image containing the part of the video image.

Furthermore, in this embodiment, a digest video image acquiring apparatus will be described that acquires, from each scene, a partial video image with a length according to a scene length, and constructs a digest video image.

Furthermore, in this embodiment, a digest video image acquiring apparatus will be described that acquires, from each scene, a partial video image with a certain length regardless of the scene length, and constructs a digest video image.

Furthermore, in this embodiment, a digest video image acquiring apparatus will be described that determines an end frame that satisfies a predetermined condition, acquires a partial video image from a start frame to the end frame, and constructs a digest video image.

FIG. 1 is a block diagram of a digest video image acquiring apparatus 1 in this embodiment.

The digest video image acquiring apparatus 1 includes a storage unit 11, an accepting unit 12, a processing unit 13, and a transmitting unit 14. The storage unit 11 includes a video image storage unit 111, a selecting condition storage unit 112, and a digest video image storage unit 113.

The processing unit 13 includes a change information acquiring unit 131, a partial video image acquiring unit 132, and an accumulating unit 133.

The partial video image acquiring unit 132 includes a frame selecting part 1321 and a partial video image acquiring part 1322.

In the storage unit 11, various types of information are stored. The various types of information are, for example, a video image from which a digest video image is generated, later-described selecting conditions, a digest video image, and the like.

In the video image storage unit 111, a video image having two or more frames is stored. The video image is a video image from which a digest video image is generated. It will be appreciated that the video image contains audio in association therewith.

In the selecting condition storage unit 112, a first selecting condition for selecting a start frame of a partial video image is stored. The first selecting condition is a condition in which later-described inter-frame change information is taken as a parameter. The first selecting condition is, for example, that a frame after an inter-frame change in which the inter-frame change information is at a threshold value or more is selected as a start frame, that a frame after an inter-frame change in which the inter-frame change information has a value that is within top N values is selected as a start frame, that a frame after X frames (X is a natural number of 1 or more) from a frame after an inter-frame change in which the inter-frame change information is at a threshold value or more is selected as a start frame, that a frame after X frames (X is a natural number of 1 or more) from a frame after an inter-frame change in which the inter-frame change information has a value that is within top N values is selected as a start frame, or the like.

It is preferable that, in the selecting condition storage unit 112, a second selecting condition for selecting an end frame of a partial video image is also stored. The second selecting condition is, for example, a condition related to the time of a partial video image. The second selecting condition is, for example, that a frame after the time calculated using an increasing function in which a scene length is taken as a parameter or after the number of frames calculated using an increasing function in which a scene length is taken as a parameter, from the start frame, is selected as an end frame. The second selecting condition is, for example, that a frame after a certain period of time from the start frame is selected as an end frame, or that a frame after a certain number of frames from the start frame is selected as an end frame.

There is no limitation on the expression of the first selecting condition and the second selecting condition. The first selecting condition and the second selecting condition are, for example, logical formulae, programs, or the like.

In the digest video image storage unit 113, the digest video image acquired by the processing unit 13 is stored.

The accepting unit 12 accepts various instructions and video images. The various instructions and video images are, for example, a start instruction, the partial video image number, a digest video image transmission instruction, and the like. The start instruction is an instruction to start generation of a digest video image. The partial video image number is the number of partial video images constituting a digest video image. The digest video image transmission instruction is an instruction to transmit a digest video image, and has a video image identifier for identifying a video image or a digest video image. The digest video image transmission instruction is received typically from a user's terminal apparatus (not shown).

The accepting is a concept that encompasses accepting information input from an input device such as a keyboard, a mouse, or a touch panel, receiving information transmitted via a wired or wireless communication line, accepting information read from a storage medium such as an optical disk, a magnetic disk, or a semiconductor memory, and the like.

The various instructions and video images may be input via any part such as a keyboard, a mouse, a menu screen, or the like. The accepting unit 12 may be realized by a device driver for an input part such as a keyboard, or control software for a menu screen, for example.

The processing unit 13 performs various types of processing. The various types of processing are, for example, processing that is performed by the change information acquiring unit 131, the partial video image acquiring unit 132, the accumulating unit 133, the frame selecting part 1321, the partial video image acquiring part 1322, and the like.

The change information acquiring unit 131 acquires inter-frame change information, from a video image in the video image storage unit 111. The inter frame change information is information indicating a change between two or more frames, among two or more frames constituting a video image.

The change information acquiring unit 131 may, for example, acquire one or at least two feature values related to a change between two frames, and acquire inter-frame change information using the one or at least two feature values. In this case, the inter-frame change information is expressed, for example, by a natural number of 0 to 9. A larger value of the inter-frame change information indicates a larger change. One or more feature values are, for example, a DC component, a luminance, a color value, a color difference, a histogram correlation, or the like.

The change information acquiring unit 131 performs, for example, first to third processing for acquiring the above-described inter-frame change information, thereby acquiring first inter-frame change information, second inter-frame change information, and third inter-frame change information. The change information acquiring unit 131 acquires inter-frame change information, using the first inter-frame change information, the second inter-frame change information, and the third inter-frame change information. The first inter-frame change information, the second inter-frame change information, and the third inter-frame change information are each such that a larger value (a larger change) leads to a larger value (e.g., a value closer to 9) of the inter-frame change information. It will be appreciated that, in the case of acquiring inter-frame change information from a pair of two frames, the change information acquiring unit 131 acquires a frame derivative value, as the inter-frame change information.

The change information acquiring unit 131 may acquire a group of three or more frames, and acquire inter-frame change information from the group of three or more frames. The change information acquiring unit 131 may, for example, acquire a frame derivative value between the former two frames of the group of three frames and a frame derivative value between the latter two frames, and acquire inter-frame change information from a difference between the two frame derivative values. The change information acquiring unit 131 typically acquires inter-frame change information, using an increasing function in which a difference between the two frame derivative values is taken as a parameter.

The inter-frame change information may be a derivative value of information indicating a change between two or more frames (which may be referred to as the degree of a change, the slope of a change, etc.). That is to say, the change information acquiring unit 131 may, for example, acquire a derivative value of information related to two or more changes acquired from one or more of the first inter-frame change information, the second inter-frame change information, and the third inter-frame change information described above.

It is sufficient that the inter-frame change information is information related to a change between two or more different frames. It is sufficient that the inter-frame change information is information related to a change between two or more different frames preferably including adjacent frames.

More specifically, the change information acquiring unit 131 operates, for example, as follows. First, the change information acquiring unit 131 sequentially selects pairs of two frames from which inter-frame change information is to be acquired, from the beginning of a video image. Next, the change information acquiring unit 131 acquires inter-frame change information from each selected pair of frames.

The inter-frame change information is acquired, for example, using a decreasing function (e.g., an inverse number) in which a similarity between images that are two frames is taken as a parameter. The inter-frame change information is calculated, for example, through any one of the following first to fourth processing.

The first acquiring processing of the inter-frame change information is pixel-unit comparing processing. The pixel-unit comparing processing acquires a color value difference, which is a difference between color values (e.g., RGB values) of the same pixels on spaces of two frames. If color values of pixels at the same positions of two frames (a frame 1 and a frame 2) are respectively (r1, g1, b1) and (r2, g2, b2), a color value difference (d) is expressed by Numerical Formula 1.

The change information acquiring unit 131 acquires, for example, an average of color value differences between multiple pixels, as the inter-frame change information. The change information acquiring unit 131 may, for example, acquire inter-frame change information whose value increases in accordance with an increase in the average value of the color value differences. That is to say, the change information acquiring unit 131 may acquire inter-frame change information, using an increasing function in which an average of color value differences is taken as a parameter. Note that the inter-frame change information obtained through the pixel-unit comparing processing is referred to as the first inter-frame change information.

$$d = \sqrt{(r1-r2)^2 + (g1-g2)^2 + (b1-b2)^2} \quad (1)$$

The second acquiring processing of the inter-frame change information is pixel comparing processing. The pixel comparing processing calculates a color value difference (d) between pixels at the same positions of two frames (the frame 1 and the frame 2), determines pixels as error pixels if the color value difference (d) is at a threshold value or more or larger than the threshold value, and acquires the number of error pixels. That is to say, the change information acquiring unit 131 acquires the number of error pixels, as the inter-frame change information. The change information acquiring unit 131 may acquire inter-frame change information whose value increases in accordance with an increase in the number of error pixels. That is to say, the change information acquiring unit 131 may acquire inter-frame change information, using an increasing function in which the number of error pixels is taken as a parameter. Note that the inter-frame change information obtained through the pixel comparing processing is referred to as the second inter-frame change information.

The third acquiring processing of the inter-frame change information is color histogram comparing processing. The color histogram is a bar graph generated by counting the number of pixels of each color in an image. The color histogram comparing processing is, for example, processing that acquires the total of differences between the numbers of individual colors, or the average, the median, or the like of differences between the numbers of individual colors of two frames, as the inter-frame change information. The change information acquiring unit 131 may, for example, acquire inter-frame change information whose value increases in accordance with an increase in the total of differences between the numbers of individual colors, or the average, the median, or the like of differences between the numbers of individual colors of two frames. That is to say, the change information acquiring unit 131 may acquire inter-frame change information, using an increasing function in which the total of differences between the numbers of individual colors, or the average, the median, or the like of differences between the numbers of individual colors of two frames is taken as a parameter. Note that the inter-frame change information obtained through the color histogram comparing processing is referred to as the third inter-frame change information.

Furthermore, the change information acquiring unit 131 may, for example, acquire normalized inter-frame change information (e.g., an integer of 0 to 9) in the above-described processing.

The fourth acquiring processing of the inter-frame change information is divided region comparing processing. The divided region comparing processing is processing as follows. That is to say, the change information acquiring unit 131 divides each of two frames (the frame 1 and the frame 2) into two or more regions, thereby obtaining two or more divided regions. The change information acquiring unit 131 acquires, for each of the two or more divided regions, divided region change information, which is information indicating the degree of a change between divided regions, in the same divided regions of the two frames. The change information acquiring unit 131 acquires inter-frame change information, using the two or more pieces of divided regions change information of the two or more divided regions. In the divided region comparing processing, the change information acquiring unit 131 may acquire divided region change information through the above-described pixel-unit comparing processing, may acquire divided region change information through the pixel comparing processing, or may acquire divided region change information using differences of one or more feature values in two divided regions, from two or more divided regions.

The partial video image acquiring unit 132 acquires one or at least two partial video images from a video image, using the inter-frame change information. The partial video image is part of a video image. The processing that acquires a partial video image may be processing that specifies a start frame and an end frame of a partial video image. Specifically, in a case where the inter-frame change information is information indicating a change that is large enough to satisfy a predetermined condition, the partial video image acquiring unit 132 acquires one or more partial video images containing a frame corresponding to the inter-frame change information. The frame corresponding to the inter-frame change information is typically two or more frames from which the inter-frame change information was calculated. The frame corresponding to the inter-frame change information is typically the temporally last frame, in the two or more frames from which the inter-frame change information was calculated. Note that the frame corresponding to the inter-frame change information may be a frame that is temporally after (e.g., a frame that is three frames after, a frame that is 10 frames after, etc.) either one of the two or more frames from which the inter-frame change information was calculated.

The partial video image acquiring unit 132 may acquire partial video images in a number that matches the partial video image number accepted by the accepting unit 12. The length (e.g., the period of time, the number of frames) of a partial video image that is acquired by the partial video image acquiring unit 132 may be determined in advance, or may be dynamically changed.

The frame selecting part 1321 selects one or more frames that match the first selecting condition. The one or more frames acquired by the frame selecting part 1321 is a start frame of a partial video image. The first selecting condition is, for example, that the inter-frame change information is at a threshold value or more or larger than the threshold value. The first selecting condition is, for example, that the inter-frame change information has a value that is within top N values. Note that N is the partial video image number, or the partial video image number−1, and is a natural number.

The partial video image acquiring part 1322 acquires one or more partial video images in which one or more frames selected by the frame selecting part 1321 are respectively taken as start frames.

The partial video image acquiring part 1322 may acquire a partial video image with a length according to a scene length, from each of two or more scenes. A scene is a frame group from a start frame to a next start frame, or a frame group from a start frame to an end frame of a video image.

The partial video image acquiring part 1322 may acquire a partial video image with a certain length, from each of two or more scenes. The information for specifying the certain length is stored in the storage unit 11.

The partial video image acquiring part 1322 selects, as an end frame, one or more frames that match the second selecting condition, and acquires a partial video image from the start frame to the selected end frame. The second selecting condition is, for example, that a frame that is M frames after the start frame is selected as an end frame. The second selecting condition is, for example, that a length of a partial video image according to a scene length containing the start frame is determined, and a frame corresponding to the length of the partial video image from the start frame is selected as an end frame.

The accumulating unit 133 accumulates a digest video image having one or more partial video images acquired by the partial video image acquiring unit 132. The accumulating unit 133 may generate a digest video image by linking two or more partial video images acquired by the partial video image acquiring unit 132, and accumulate the digest video image. The accumulating is typically storing in the storage unit 11, but also may be accumulating in an external apparatus. The accumulating a digest video image may be adding flags in association with a start frame and an end frame of a video image, and constructing a situation in which a digest video image can be reproduced using the flags. The flags are, for example, a start flag or an end flag, which will be described later.

The transmitting unit 14 transmits a digest video image to an unshown terminal apparatus. The transmitting unit 14 may transmit one or more partial video images acquired by the partial video image acquiring unit 132, to a terminal apparatus. For example, if the accepting unit 12 has accepted a digest video image transmission instruction, the transmitting unit 14 transmits a digest video image corresponding to the digest video image transmission instruction, to the terminal apparatus. This terminal apparatus is an apparatus that has transmitted the digest video image transmission instruction.

The storage unit 11, the video image storage unit 111, the selecting condition storage unit 112, and the digest video image storage unit 113 are preferably non-volatile storage media, but also may be realized by volatile storage media.

There is no limitation on the procedure in which the information is stored in the storage unit 11 and the like. For example, the information may be stored in the storage unit 11 and the like via a storage medium, the information transmitted via a communication line or the like may be stored in the storage unit 11 and the like, or the information input via an input device may be stored in the storage unit 11 and the like.

The processing unit 13, the change information acquiring unit 131, the partial video image acquiring unit 132, the accumulating unit 133, the frame selecting part 1321, and the partial video image acquiring part 1322 may be realized typically by MPUs, memories, or the like. Typically, the processing procedure of the processing unit 13 and the like is realized by software, and the software is stored in a storage medium such as a ROM. Note that the processing procedure of the processing unit 13 and the like may be realized also by hardware (dedicated circuits).

The transmitting unit 14 is realized typically by a wireless or wired communication part, but may be realized also by a broadcasting part.

Next, an operation of the digest video image acquiring apparatus 1 will be described with reference to the flowchart in FIG. 2.

(Step S201) The accepting unit 12 determines whether or not it has accepted a start instruction. If it has accepted a start instruction, the procedure advances to step S202, and, if not, the procedure advances to step S212.

(Step S202) The change information acquiring unit 131 substitutes 1 for a counter i.

(Step S203) The change information acquiring unit 131 determines whether or not there is an $i^{-th}$ pair in a video image in the video image storage unit 111. If there is an $i^{-th}$ pair, the procedure advances to step S204, and, if not, the procedure advances to step S206. The $i^{-th}$ pair refers to two or more frames from which inter-frame change information is to be acquired. For example, the $i^{-th}$ pair refers to two successive frames from which inter-frame change information is to be acquired.

(Step S204) The change information acquiring unit 131 acquires inter-frame change information from the frame group in the $i^{-th}$ pair. The inter-frame change information acquiring processing will be described with reference to the flowcharts in FIGS. 3 and 4.

(Step S205) The change information acquiring unit 131 increments the counter i by 1. The procedure returns to step S203.

(Step S206) The frame selecting part 1321 selects one or at least two start frames that match a first selecting condition. The first selecting condition is, for example, that the frame has the inter-frame change information that is at a threshold value or more or larger than the threshold value (that has a significant change). The start frame is typically the last frame in the frame group in the $i^{-th}$ pair.

(Step S207) The partial video image acquiring part 1322 substitutes 1 for a counter j.

(Step S208) The partial video image acquiring part 1322 determines whether or not there is a $j^{-th}$ start frame. If there is a $j^{-th}$ start frame, the procedure advances to step S209, and, if not, the procedure advances to step S211.

(Step S209) The partial video image acquiring part 1322 determines an end frame that matches a second selecting condition, the end frame corresponding to the $j^{-th}$ start frame. The end frame is a frame that is temporally before a $(j+1)^{-th}$ start frame. The processing in which the partial video image acquiring part 1322 determines an end frame is, for example, to acquire an identifier (e.g., a frame number) of an end frame, to accumulate an identifier (e.g., a frame number) of an end frame in association with an identifier of the start frame, to add, to an end frame, a flag indicating that it is an end frame, or the like. There is no limitation on the content of the processing for determining an end frame.

(Step S210) The partial video image acquiring part 1322 increments the counter j by 1. The procedure returns to step S208.

(Step S211) The accumulating unit 133 accumulates a digest video image having one or more partial video images acquired by the partial video image acquiring unit 132. The procedure returns to step S201. The accumulating unit 133 may, for example, extract a frame group from a start frame to an end frame, acquire a partial video image, generate a digest video image by linking the acquired two or more partial video images, and accumulate the digest video image. The accumulating unit 133 may accumulate a pair of the identifier of the start frame acquired by the frame selecting part 1321 and the identifier of the end frame acquired by the partial video image acquiring part 1322, in the storage unit 11. The accumulating unit 133 may add, to the start frame corresponding to the identifier of the start frame acquired by the frame selecting part 1321, a flag indicating that it is a start frame, and add, to the end frame corresponding to the identifier of the end frame acquired by the partial video image acquiring part 1322, a flag indicating that it is an end frame. That is to say, it is sufficient that the processing in which the accumulating unit 133 accumulates a digest video image is processing that allows a digest video image to be acquired.

(Step S212) The accepting unit 12 determines whether or not it has received a digest video image transmission instruction from an unshown terminal apparatus. If it has received a digest video image transmission instruction, the procedure advances to step S213, and, if not, the procedure returns to step S201.

(Step S213) The processing unit 13 acquires a digest video image corresponding to the digest video image transmission instruction received in step S212.

(Step S214) The transmitting unit 14 transmits the digest video image acquired in step S213 to the unshown terminal apparatus. The procedure returns to step S201.

Figure 2:
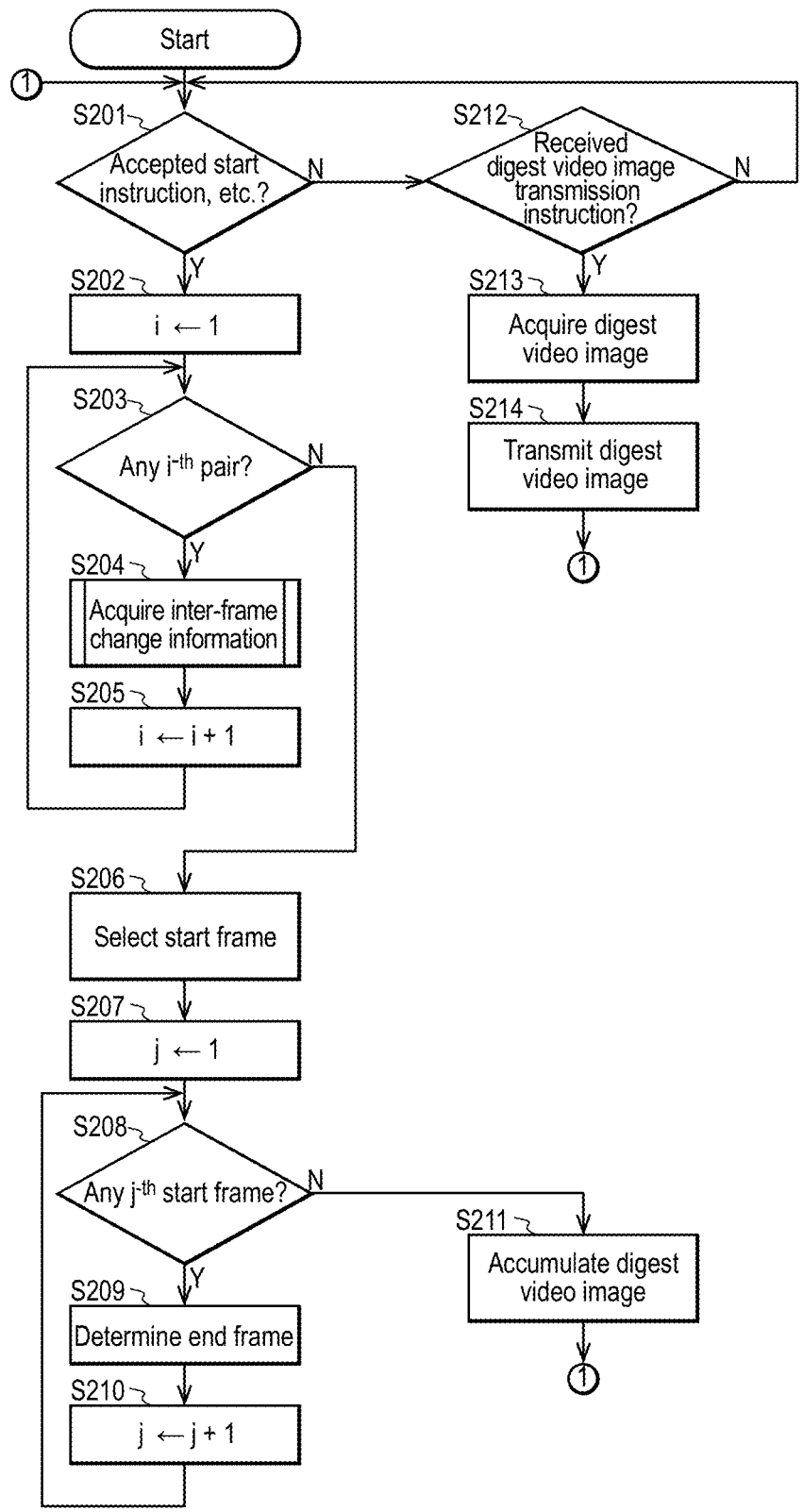
FIG. 2 is a flowchart illustrating an operation of the digest video image acquiring apparatus 1 in the embodiment.

It may be assumed that, in the flowchart in FIG. 2, for example, a frame pair that is to be subjected to the inter-frame change information acquiring processing is constituted by two frames, more specifically, temporally successive two frames.

Furthermore, in the flowchart in FIG. 2, the partial video image acquiring part 1322 may take the first frame in a video image as a start frame of a partial video image, and determine an end frame that matches the second selecting condition.

Note that the procedure is terminated by powering off or an interruption at the end of the process in the flowchart in FIG. 2.

Next, a first example of the inter-frame change information acquiring processing in step S204 will be described with reference to the flowchart in FIG. 3. In the flowchart in FIG. 3, the inter-frame change information acquiring processing will be described using, as an example, the pixel comparing processing described above. In this flowchart, temporally successive two frames that are to be subjected to the inter-frame change information acquiring processing are respectively taken as a frame 1 and a frame 2. It is assumed that, in a video image, the frame 1 is followed by the frame 2.

(Step S301) The change information acquiring unit 131 substitutes 1 for a counter i. The change information acquiring unit 131 substitutes 0 for a variable "number of errors".

(Step S302) The change information acquiring unit 131 determines whether or not there is an $i^{-th}$ pixel in the frame 1 or the frame 2. If there is an $i^{-th}$ pixel, the procedure advances to step S303, and, if not, the procedure advances to step S309. For example, the change information acquiring unit 131 sequentially scans the pixels the frame 1 or the frame 2, and acquires the $i^{-th}$ pixel.

(Step S303) The change information acquiring unit 131 acquires a color value of the $i^{-th}$ pixel in the frame 1.

(Step S304) The change information acquiring unit 131 acquires a color value of the $i^{-th}$ pixel in the frame 2. The in-frame coordinate position of the $i^{-th}$ pixel in the frame 1 is the same as the in-frame coordinate position of the $i^{-th}$ pixel in the frame 2.

(Step S305) The change information acquiring unit 131 calculates a distance between the two color values acquired in steps S303 and S304. This distance can be calculated using Numerical Formula 1 above.

(Step S306) The change information acquiring unit 131 determines whether or not the distance acquired in step S305 is at a threshold value or more. If the distance is at a threshold value or more, the procedure advances to step S307, and, if the distance is less than the threshold value, the procedure advances to step S308.

(Step S307) The change information acquiring unit 131 adds 1 to the variable "number of errors".

(Step S308) The change information acquiring unit 131 increments the counter i by 1.

(Step S309) The change information acquiring unit 131 substitutes the value of the variable "number of errors" for the inter-frame change information.

Figure 3:
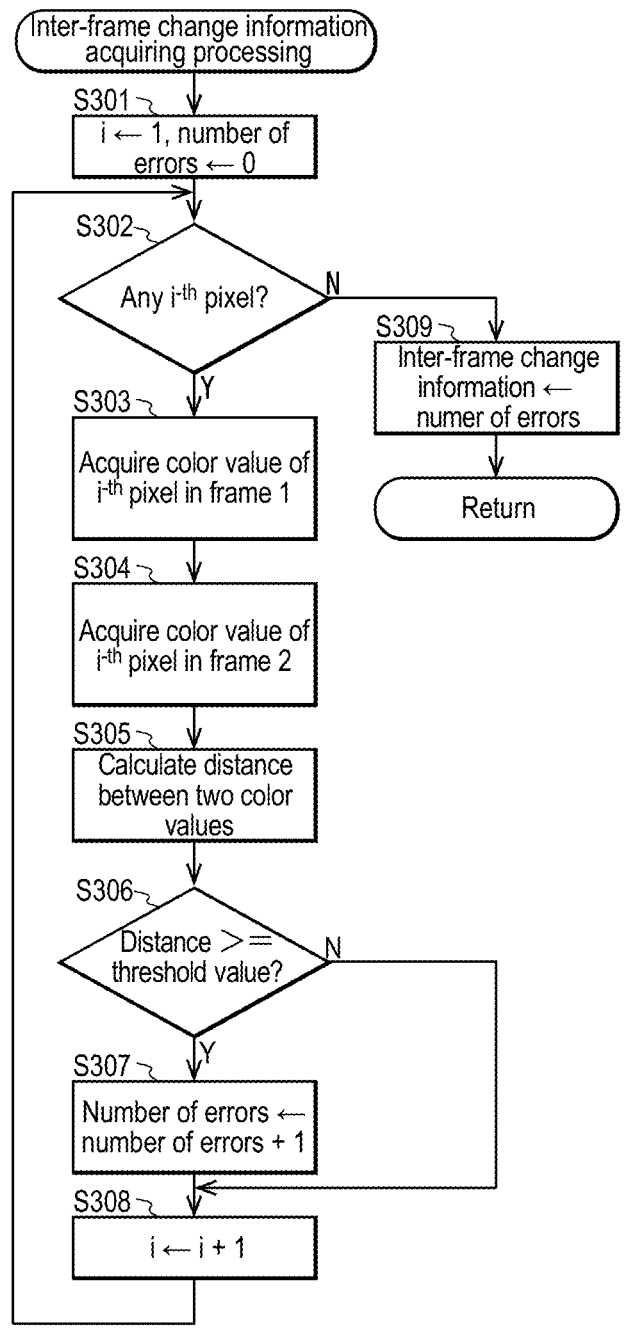
FIG. 3 is a flowchart illustrating a first example of inter-frame change information acquiring processing in the embodiment.

In the flowchart in FIG. 3, the inter-frame change information is acquired using color values of pixels. However, in the flowchart in FIG. 3, it is also possible to calculate a distance (also referred to as a "difference") between two pixels using other feature values (also referred to as "attribute values") of pixels, and acquire inter-frame change information using this distance. Note that other feature values of pixels are, for example, a luminance and a lightness.

Figure 4:
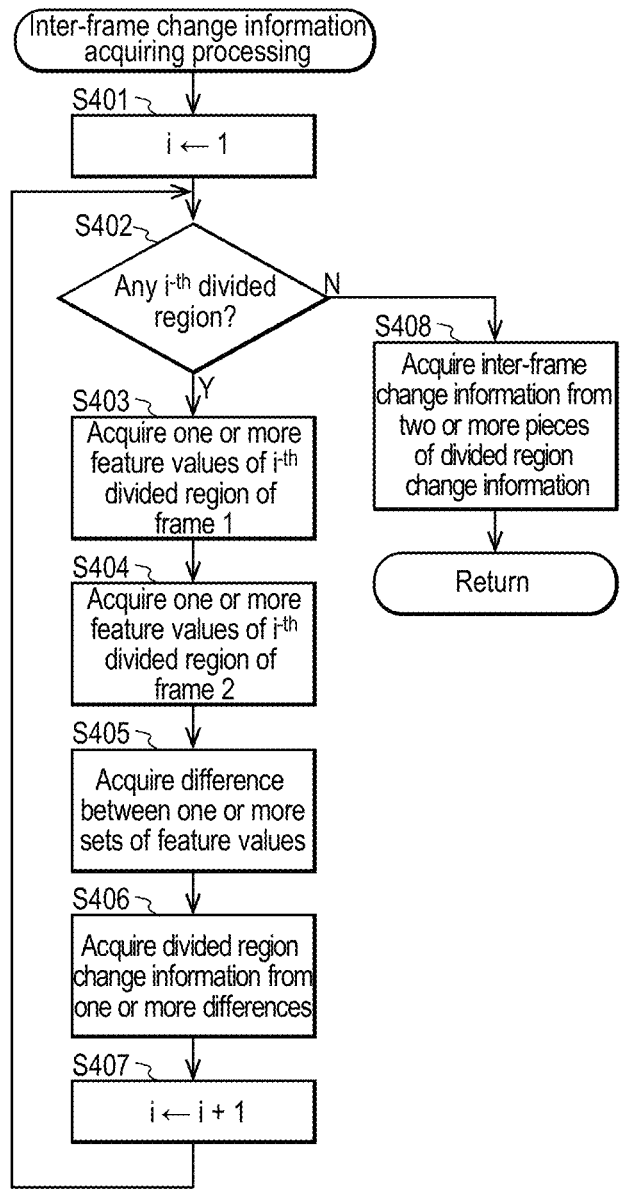
FIG. 4 is a flowchart illustrating a second example of inter-frame change information acquiring processing in the embodiment.

Next, a second example of the inter-frame change information acquiring processing in step S204 will be described with reference to the flowchart in FIG. 4. In the flowchart in FIG. 4, the inter-frame change information acquiring processing will be described using, as an example, the divided region comparing processing described above. In this flowchart, two successive frames that are to be subjected to the inter-frame change information acquiring processing are respectively taken as a frame 1 and a frame 2. It is assumed that, in a video image, the frame 1 is followed by the frame 2.

(Step S401) The change information acquiring unit 131 substitutes 1 for a counter i.

(Step S402) The change information acquiring unit 131 determines whether or not there is an $i^{-th}$ divided region in the frame 1 or the frame 2. If there is an $i^{-th}$ divided region, the procedure advances to step S403, and, if not, the procedure advances to step S408. In the storage unit 11, divided region specifying information (e.g., an upper left coordinate and a lower right coordinate of a region) for specifying two or more divided regions is stored. The change information acquiring unit 131 sequentially acquires pieces of the divided region specifying information in the storage unit 11, and determines whether or not there is an $i^{-th}$ divided region (whether or not there is an $i^{-th}$ piece of divided region specifying information in the storage unit 11).

(Step S403) The change information acquiring unit 131 acquires one or more feature values of the $i^{-th}$ divided region of the frame 1. The one or more feature values are, for example, an average of color values of pixels of the $i^{-th}$ divided region, an average of luminances of pixels of the $i^{-th}$ divided region, information regarding color histograms of the $i^{-th}$ divided region, or the like. The change information acquiring unit 131 acquires, for example, the $i^{-th}$ piece of divided region specifying information from the storage unit 11. The change information acquiring unit 131 acquires, for example, one or more feature values from an image of a region indicated by the divided region specifying information.

(Step S404) The change information acquiring unit 131 acquires one or more feature values of the i$^{-th}$ divided region of the frame 2.

(Step S405) The change information acquiring unit 131 acquires a difference between feature values, using the one or more feature values acquired in step S403 and the one or more feature values acquired in step S404. That is to say, for example, the change information acquiring unit 131 acquires a difference between the average of the color values of the frame 1 acquired in step S403 and the average of the color values of the frame 2 acquired in step S404, and acquires a difference between the averages of the luminances of the frame 1 and the average of the luminances of the frame 2.

(Step S406) The change information acquiring unit 131 acquires divided region change information of the i$^{-th}$ divided region, from the information regarding the one or more differences acquired in step S405. The change information acquiring unit 131 acquires divided region change information such that the divided region change information of the i$^{-th}$ divided region has a value that increases in accordance with an increase in the difference indicated by the information regarding the one or more differences acquired in step S405.

(Step S407) The change information acquiring unit 131 increments the counter i by 1. The procedure returns to step S402.

(Step S408) The change information acquiring unit 131 acquires inter-frame change information, using the divided region change information of the two or more divided regions acquired in step S406. The procedure returns to the upper-level processing. Note that the change information acquiring unit 131 may acquire the average or the median of the two or more pieces of divided regions change information as the inter-frame change information, or may acquire the largest value of the two or more pieces of divided regions change information as the inter-frame change information. That is to say, it is sufficient to acquire inter-frame change information whose value increases in accordance with an increase in the value of the divided region change information.

Hereinafter, a specific operation of the digest video image acquiring apparatus 1 in this embodiment will be described.

It is assumed that one video image is stored in the video image storage unit 111. A user has input a start instruction having the partial video image number "5" to the digest video image acquiring apparatus 1. One video image is, for example, a video image having 18000 frames consisting of those with the frame numbers 0 to 17999.

Next, the accepting unit 12 accepts a start instruction. The change information acquiring unit 131 adds inter-frame change information "−1" to the storage unit 11 in association with the frame number 0.

Next, the change information acquiring unit 131 acquires the frame number 0 and the frame number 1 in the video image in the video image storage unit 111. The change information acquiring unit 131 acquires inter-frame change information indicating the degree of a change from the frame number 0 to the frame number 1, for example, through the divided region comparing processing described above. In this example, it is assumed that the change information acquiring unit 131 acquires divided region change information of each divided region of the frame number 0 and the frame number 1, and acquires normalized inter-frame change information "1", using the divided region change information of each divided region. The change information acquiring unit 131 adds inter-frame change information "1" to the storage unit 11 in association with the frame number 1. The change information acquiring unit 131 acquires inter-frame change information expressed by an integer of any one of "0" to "9".

In a similar manner, it is assumed that the change information acquiring unit 131 acquires inter-frame change information "2" between the frame number 1 and the frame number 2. The change information acquiring unit 131 accumulates the inter-frame change information "2" in the storage unit 11 in association with the frame number 2.

Furthermore, it is assumed that the change information acquiring unit 131 acquires inter-frame change information "7" between the frame number 2 and the frame number 3. The change information acquiring unit 131 accumulates the inter-frame change information "7" in the storage unit 11 in association with the frame number 3.

Figure 5:
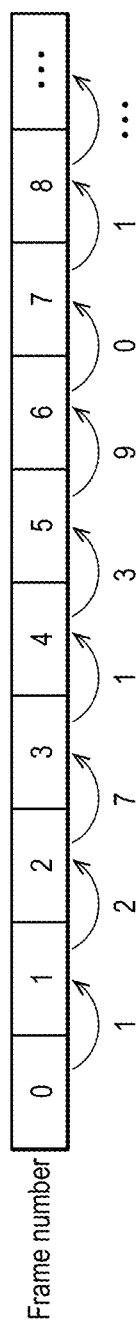
FIG. 5 is a conceptual diagram showing calculation of inter-frame change information in the embodiment.

The change information acquiring unit 131 performs the above-described processing to frames up to the last frame of the video image. It is assumed that the change information acquiring unit 131 has calculated inter frame change information having a concept as shown in FIG. 5. The change information acquiring unit 131 has accumulated information of "ID", "frame number", and "inter-frame change information" in the inter-frame change information management table shown in FIG. 6. The inter-frame change information management table holds records, in a number that matches the number of frames, having "ID", "frame number", "inter-frame change information", "start frame flag", and "end frame flag". "Start frame flag" is a flag indicating whether or not it is a start frame, and "end frame flag" is a flag indicating whether or not it is an end frame.

Next, the frame selecting part 1321 selects start frames in which the inter-frame change information has a value that is within top five values. It is assumed that the frame selecting part 1321 has selected frames with the frame numbers "6", "2517", "4510", "8321", and "12548" in which the inter-frame change information has the value "9", as start frames. The frame selecting part 1321 accumulates the start flag "1" in association with the frame numbers of the start frames. The frame selecting part 1321 accumulates the start flag "0" in association with frame numbers other than those of the start frames. The start flag "1" indicates that it is a start flag, and the start flag "0" indicates that it is not a start flag. If partial video images in a number more than the partial video image number are acquired when all frames corresponding to the same inter-frame change information are taken as start frames, the frame selecting part 1321 preferably selects start flags at equal intervals to the extent possible.

Next, the partial video image acquiring part 1322 determines an end frame for each start frame, for example, as follows. The partial video image acquiring part 1322 determines end frames, for example, such that the partial video images have lengths according to scene lengths. The partial video image acquiring part 1322 acquires, for example, the number of frames "2517−6+1=2512" of the first partial video image, the number of frames "4510−2517+1=1994" of the second partial video image, the number of frames "8321−4510+1=3812" of the third partial video image, the number of frames "12548−8321+1=4228" of the fourth partial video image, and the number of frames "last frame number (e.g., 177999)−12548+1=5452" of the fifth partial video image. The partial video image acquiring part 1322 determines end frames, for example, such that the partial video images have lengths substantially in a ratio of "2512: 1994:3812:4228:5452". For example, the partial video image acquiring part 1322 acquires a frame number "508" as an end frame corresponding to the start frame "6". The partial video image acquiring part 1322 writes an end frame flag "1" in association with the frame number "508". For example, the partial video image acquiring part 1322 acquires a frame number "2916" as an end frame corresponding to the start frame "2517". The partial video image acquiring part 1322 writes an end frame flag "1" in association with the frame number "2916". For example, the partial video image acquiring part 1322 acquires a frame number "5272" as an end frame corresponding to the start frame "4510". The partial video image acquiring part 1322 writes an end frame flag "1" in association with the frame number "5272". For example, the partial video image acquiring part 1322 acquires a frame number "9167" as an end frame corresponding to the start frame "8321". The partial video image acquiring part 1322 writes an end frame flag "1" in association with the frame number "9167". The partial video image acquiring part 1322 writes an end frame flag "1" in association with the last frame of the video image. Note that an end frame flag "0" is written to frames that are not an end frame.

If the inter-frame change information corresponding to the frame number of the end frame calculated above is at a threshold value or more, the partial video image acquiring part 1322 preferably selects, as an end frame, a frame positioned before or after the frame number, at which a change indicated by the inter-frame change information tends to be smaller than a predetermined change.

Furthermore, in this case, it is assumed that the number of frames (which also may be reproduction time) of a digest video image is stored in advance in the storage unit 11. The number of frames (which also may be reproduction time) of a digest video image may be designated by a user.

Next, the accumulating unit 133 acquires, as a partial video image, a video image from the frame corresponding to the start frame flag "1" to the frame corresponding to the next end frame "1" in FIG. 6. Next, the accumulating unit 133 constructs a digest video image by linking the acquired five partial video images, and accumulates the digest video image in the digest video image storage unit 113.

It is assumed that, after the above-described processing for generating a digest video image, the digest video image acquiring apparatus 1 receives a digest video image transmission instruction from a user's terminal apparatus.

Next, the processing unit 13 acquires a digest video image corresponding to the received digest video image transmission instruction. Note that the processing unit 13 may read a digest video image from the digest video image storage unit 113, or may construct a digest video image from a video image in the video image storage unit 111 using the management table in FIG. 6.

Next, the transmitting unit 14 transmits the acquired digest video image, to the terminal apparatus that has transmitted the digest video image transmission instruction.

As described above, according to this embodiment, a digest video image was acquired using the inter-frame change information, and thus it is possible to acquire an appropriate digest video image.

In this embodiment, two partial video images acquired by the partial video image acquiring unit 132 may be successively arranged in a video image. That is to say, a next frame of an end frame of a partial video image may be a start frame of a next partial video image.

Furthermore, in the specific examples of this embodiment, a partial video image was acquired using the partial video image number. That is to say, in the above-described specific examples, the first selecting condition was "a frame after an inter-frame change in which the inter-frame change information has a value that is within top N values is selected as a start frame". However, as described above, it will be appreciated that the first selecting condition may be other conditions such as "a frame after an inter-frame change in which the inter-frame change information is at a threshold value or more or larger than the threshold value is selected as a start frame" or the like.

The processing in the embodiments may be realized by software. The software may be distributed by software downloads or the like. Furthermore, the software may be distributed in a form where the software is stored in a storage medium such as a CD-ROM. Note that the same is applied to other embodiments described in this specification. The software that realizes the digest video image acquiring apparatus 1 in this embodiment may be the following sort of program. Specifically, this program is a program for causing a computer to function as: a change information acquiring unit that acquires inter-frame change information, which is information indicating a change between two or more frames, among two or more frames constituting a video image; a partial video image acquiring unit that acquires one or at least two partial video images, each of which is part of the video image accepted by the accepting unit, using the inter-frame change information; and an accumulating unit that accumulates a digest video image having one or more partial video images acquired by the partial video image acquiring unit.

Furthermore, in this program, it is preferable to cause the computer to function such that the partial video image acquiring unit acquires, in a case where the inter-frame change information is information indicating a change that is large enough to satisfy a predetermined condition, one or more partial video images containing a frame corresponding to the inter-frame change information.

Furthermore, in this program, it is preferable to cause the computer to function such that the change information acquiring unit acquires two or more feature values related to a change between two frames, and acquires inter-frame change information, using the two or more feature values.

Furthermore, in this program, it is preferable to cause the computer to further function as: an accepting unit that accepts a partial video image number, which is the number of partial video images, wherein the partial video image acquiring unit acquires partial video images in a number that matches the partial video image number.

Furthermore, in this program, it is preferable to cause the computer to function such that the partial video image acquiring unit includes: a frame selecting part that selects one or more frames that match a first selecting condition for selecting a start frame of a partial video image; and a partial video image acquiring part that acquires one or more partial video images in which one or more frames selected by the frame selecting part are respectively taken as start frames.

Furthermore, in this program, it is preferable to cause the computer to function such that the partial video image acquiring part acquires a partial video image with a length according to a scene length, from each of two or more scenes from the start frame to a next start frame or an end frame of the video image.

Furthermore, in this program, it is preferable to cause the computer to function such that the partial video image acquiring part acquires a partial video image with a certain length, from each of two or more scenes from the start frame to a next start frame or an end frame of the video image.

Furthermore, in this program, it is preferable to cause the computer to function such that the partial video image acquiring part selects one or more frames that match a second selecting condition for selecting an end frame of a partial video image, and acquires a partial video image from the start frame to the selected end frame.

Embodiment 2

In this embodiment, a video image processing apparatus will be described that acquires inter-frame change information, which is information indicating a change between frames of a video image, and outputs information (e.g., a flag-provided screen) clearly indicating a point at which the inter-frame change information is information indicating a change that is large enough to satisfy a predetermined condition.

Furthermore, in this embodiment a video image processing apparatus will be described that, in a case where a condition is provided, information that is clearly indicated (e.g., flag points) increases or decreases.

Furthermore, in this embodiment, a video image processing apparatus will be described that accepts selection of one scene. Furthermore, in this embodiment, a video image processing apparatus will be described that outputs a partial video image corresponding selected one scene.

Figure 7:
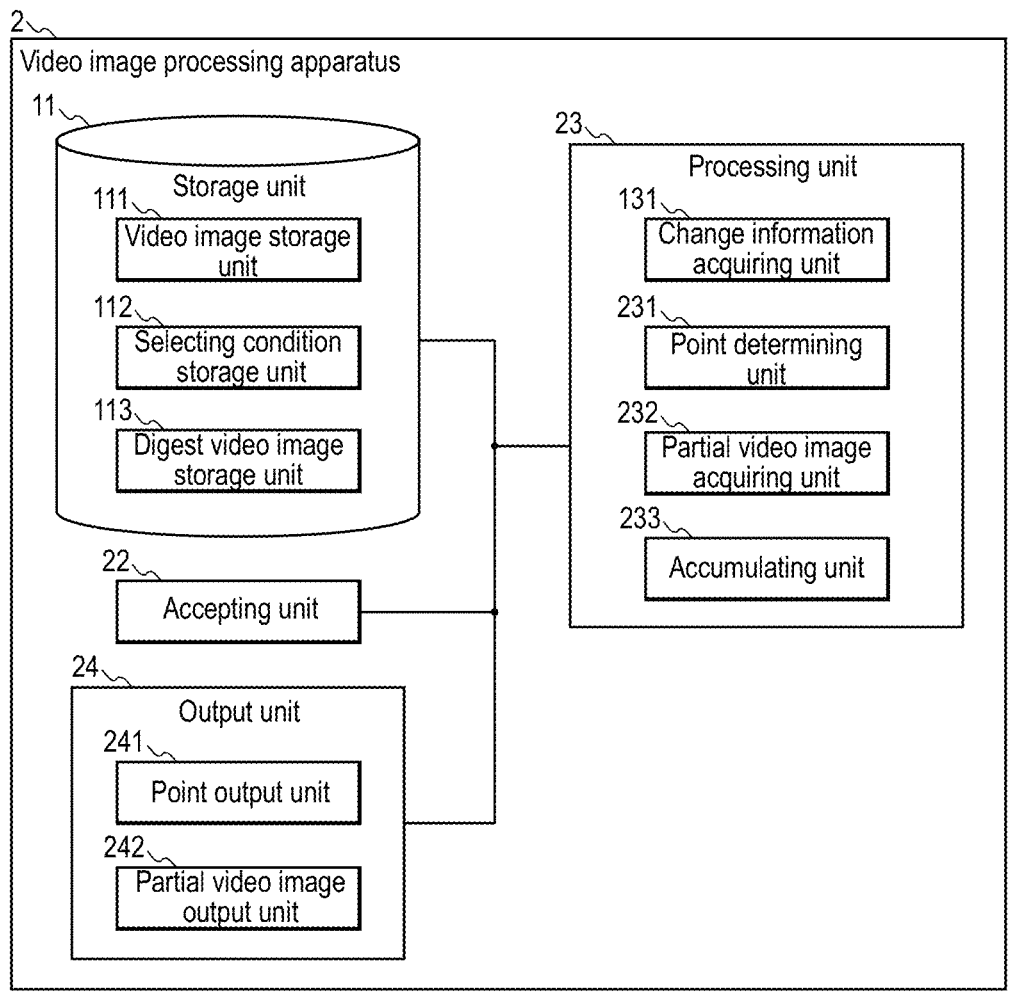
FIG. 7 is a block diagram of a video image processing apparatus 2 in Embodiment 2.

FIG. 7 is a block diagram of a video image processing apparatus 2 in this embodiment. The video image processing apparatus 2 includes the storage unit 11, an accepting unit 22, a processing unit 23, and an output unit 24.

The processing unit 23 includes the change information acquiring unit 131, a point determining unit 231, a partial video image acquiring unit 232, and an accumulating unit 233. The output unit 24 includes a point output unit 241 and a partial video image output unit 242.

The accepting unit 22 accepts various types of information, instructions, and the like. The various types of information, instructions, and the like are, for example, the first selecting condition. The first selecting condition was described above. The various types of information, instructions, and the like are, for example, selection of one scene from among two or more scenes. Input of the first selecting condition may be input using any part, such as input of a threshold value using a keyboard, input of a threshold value using a slider bar, or the like. Scenes are video image regions that are segmented by one or two first points output by the point output unit 241. The first point is, for example, the above-described start frame. The first point may be a group of multiple frames including the start frame. The various types of information, instructions, and the like are, for example, a start instruction. The start instruction is an instruction to start an operation. The various types of information, instructions, and the like are, for example, a digest video image acquiring instruction. The digest video image acquiring instruction is an instruction to acquire a digest video image. The various types of information, instructions, and the like are, for example, an instruction to select a start frame of a partial video image, an instruction to change a start frame of a partial video image, an instruction to select an end frame of a partial video image, an instruction to change an end frame of a partial video image, an instruction to jump between scenes, which will be described later, or the like. The instruction to select a start frame or an end frame of a partial video image is an instruction to select a start frame or an end frame of a partial video image from among frames in a video image. The instruction to change a start frame or an end frame of a partial video image is an instruction to change a start frame determined by the point determining unit 231, an automatically determined end frame, or a start frame or an end frame designated by the user.

The accepting is a concept that encompasses accepting information input from an input device such as a keyboard, a mouse, or a touch panel, receiving information transmitted via a wired or wireless communication line, accepting information read from a storage medium such as an optical disk, a magnetic disk, or a semiconductor memory, and the like.

The various types of information, instructions, and the like may be input via any part such as a keyboard, a mouse, a menu screen, or the like. The accepting unit 22 may be realized by a device driver for an input part such as a keyboard, or control software for a menu screen, for example.

The processing unit 23 performs various types of processing. The various types of processing are, for example, processing that is performed by the change information acquiring unit 131, the point determining unit 231, the partial video image acquiring unit 232, and the accumulating unit 233.

In a case where the inter-frame change information acquired by the change information acquiring unit 131 is information indicating a change that is large enough to satisfy a predetermined condition, the point determining unit 231 determines a first point corresponding to the inter-frame change information. A point is typically one frame, but may be a group of two or more frames. The point determining unit 231 may perform processing similar to that of the frame selecting part 1321 described above.

The partial video image acquiring unit 232 acquires one or at least two partial video images. The partial video image acquiring unit 232 may have functions as follows, in addition to the function of the partial video image acquiring unit 132 described in Embodiment 1. That is to say, the partial video image acquiring unit 232 may acquire one or at least two partial video images corresponding to scenes corresponding to the selection accepted by the accepting unit 22. The partial video image corresponding to a scene may be a scene itself (from the scene start frame to the scene end frame), or may be from the scene start frame to an end frame other than the scene end frame.

The partial video image acquiring unit 232 acquires a partial video image, which is part of a video image, from the video image. The processing that acquires a partial video image may be processing that specifies a start frame and an end frame of a partial video image. The partial video image acquiring unit 232 typically acquires a partial video image in which the first point determined by the point determining unit 231 is taken as a start frame, from a video image. The partial video image acquiring unit 232 may acquire a partial video image with a length according to a scene length, from each of two or more scenes. A scene is a frame group from a start frame to a next start frame, or a frame group from a start frame to an end frame of a video image. The start frame is the first point determined by the point determining unit 231, a frame designated by a user, or the like.

The partial video image acquiring unit 232 may acquire a partial video image with a certain length, from each of two or more scenes. The information for specifying the certain length is stored in the storage unit 11.

The partial video image acquiring unit 232 selects, as an end frame, one or more frames that match the second selecting condition, and acquires a partial video image from the start frame to the selected end frame. The second selecting condition is, for example, that a frame that is M frames after the start frame is selected as an end frame. The second selecting condition is, for example, that a length of a partial video image according to a scene length containing the start frame is determined, and a frame corresponding to the length of the partial video image from the start frame is selected as an end frame.

Furthermore, the partial video image acquiring unit 232 may acquire a partial video image from a start frame to an end frame, using the start frame or the end frame designated or changed by the user.

The accumulating unit 233 accumulates a digest video image having the one or at least two partial video images acquired by the partial video image acquiring unit 232. The accumulating unit 233 may generate a digest video image by linking the two or more partial video images acquired by the partial video image acquiring unit 232, and accumulate the digest video image. The accumulating is typically storing in the digest video image storage unit 113, but also may be accumulating in an external apparatus. The accumulating a digest video image may be adding flags in association with a start frame and an end frame of a partial video image, and constructing a situation in which a digest video image can be reproduced using the flags. The flags are, for example, a start flag or an end flag, which will be described later.

The output unit 24 outputs the various types of information. The various types of information are, for example, a later-described first point, display corresponding to one scene corresponding to the selection accepted by the accepting unit 22, a partial video image, or the like.

The output is a concept that encompasses display on a display screen, projection using a projector, transmission to an external apparatus, accumulation in a storage medium, delivery of a processing result to another processing apparatus or another program, and the like.

The point output unit 241 outputs a point in the video image that is the first point determined by the point determining unit 231, in a visually recognizable manner. The point output unit 241 outputs, for example, a second pattern (e.g., a specific pattern such as a flag or a star shape) to a point corresponding to the first point, at a position in or adjacent to a pattern showing the entire video image (e.g., a rectangular pattern, for example, a later-described seek bar). Note that there is no limitation on the manner in which the first point is output. It is sufficient that the user can visually recognize the first point. If the first point is one frame, the point output unit 241 may output a region or range corresponding to the frame, in a visually recognizable manner. Also in this case, it can be said that the point output unit 241 outputs the first point in a visually recognizable manner.

The point output unit 241 outputs display corresponding to one scene and the like corresponding to the selection accepted by the accepting unit 22, in an emphasized manner, compared with display corresponding to another scene and the like. The point output unit 241 displays, for example, a region of one scene or the like in a visually recognizable manner, at a position in or adjacent to a pattern showing the entire video image (e.g., a rectangular pattern). It is sufficient that one scene and the like corresponding to the selection accepted by the accepting unit 22 are displayed in a recognizable manner, and there is no limitation on the display manner. One scene and the like are one scene, or part of one scene. One scene and the like also may be referred to as one partial video image.

The partial video image output unit 242 outputs a partial video image corresponding one scene corresponding to the selection accepted by the accepting unit 22. The partial video image output unit 242 may output a start frame of a current scene. The outputting a partial video image is, for example, reproducing a partial video image.

The processing unit 23, the change information acquiring unit 131, the point determining unit 231, the partial video image acquiring unit 232, and the accumulating unit 233 may be realized typically by MPUs, memories, or the like. Typically, the processing procedure of the processing unit 23 and the like is realized by software, and the software is stored in a storage medium such as a ROM. Note that the processing procedure of the processing unit 23 and the like may be realized also by hardware (dedicated circuits).

The output unit 24, the point output unit 241, and the partial video image output unit 242 may be considered to include or not to include an output device such as a display screen or a speaker. The output unit 24 may be realized, for example, by driver software for an output device, a combination of driver software for an output device and the output device, or the like.

Next, an operation of the video image processing apparatus 2 will be described with reference to the flowchart in FIG. 8. In the flowchart in FIG. 8, a description of the same steps as those in the flowchart in FIG. 2 is omitted.

(Step S801) The accepting unit 22 determines whether or not it has accepted a start instruction. If it has accepted a start instruction, the procedure advances to step S202, and, if not, the procedure advances to step S804.

(Step S802) If the inter-frame change information acquired by the change information acquiring unit 131 is information indicating a change that is large enough to satisfy a predetermined condition, the point determining unit 231 determines one or at least two first points corresponding to the inter-frame change information. The point determining unit 231 determines, for example, one or at least two frames corresponding to the inter-frame change information indicating a change that is large enough to satisfy the first selecting condition, as the first points. The point determining unit 231 acquires, for example, frame numbers of one or at least two frames corresponding to the inter-frame change information indicating a change that is large enough to satisfy the first selecting condition.

(Step S803) The point output unit 241 outputs the one or more first points determined by the point determining unit 231, in a visually recognizable manner. The procedure returns to step S801. The output unit 24 may output other types of information. The other types of information are, for example, a first point at the first order, a partial video image at the first order, or the like.

(Step S804) The accepting unit 22 determines whether or not it has accepted the first selecting condition. If it has accepted the first selecting condition, the procedure advances to step S805, and, if not, the procedure advances to step S806. The accepting the first selecting condition may be accepting a threshold value of the inter-frame change information constituting the first selecting condition.

(Step S805) The accumulating unit 233 accumulates the first selecting condition accepted in step S804, in the selecting condition storage unit 112. The procedure advances to step S802.

(Step S806) The accepting unit 22 determines whether or not it has accepted selection of one scene or the like from among two or more scenes. If it has accepted selection of one scene or the like, the procedure advances to step S807, and, if not, the procedure advances to step S808. The scene or the like is a video image of a scene or part of a scene. Note that, before accepting selection of a video image of part of a scene, it is necessary that the last frame of the video image of part of the scene has been determined. The last frame of the video image of part of the scene may be automatically determined using the second selecting condition as described in Embodiment 1, or may be determined according to an instruction from a user. A video image of part of a scene is a partial video image. A scene also may be referred to as a partial video image.

(Step S807) The point output unit 241 outputs display corresponding to one scene and the like corresponding to the selection accepted in step S806, in an emphasized manner, compared with display corresponding to another scene and the like.

(Step S808) The accepting unit 22 determines whether or not it has accepted a digest video image acquiring instruction. If it has accepted a digest video image acquiring instruction, the procedure advances to step S809, and, if not, the procedure advances to step S811.

(Step S809) The partial video image acquiring unit 232 acquires one or more partial video images selected in step S806. The partial video image acquiring unit 232 typically acquires one or more partial video images in which the one or more first points determined by the point determining unit 231 are respectively taken as start frames. The partial video image also may be a scene.

(Step S810) The accumulating unit 233 acquires and accumulates a digest video image having the one or more partial video images acquired in step S809. The procedure returns to step S801.

(Step S811) The accepting unit 22 determines whether or not it has accepted an instruction to change a start frame or an end frame of a partial video image. If it has accepted a change instruction, the procedure advances to step S812, and, if not, the procedure returns to step S801.

(Step S812) The processing unit 23 changes the start frame or the end frame according to the change instruction in step S811. The changing a start frame or an end frame is, for example, re-writing a flag associated with the frame number of the start frame or the end frame to a start flag or an end flag, changing a flag associated with the frame number of the original start frame or end frame to information that is neither a start flag nor an end flag, or the like.

Figure 8:
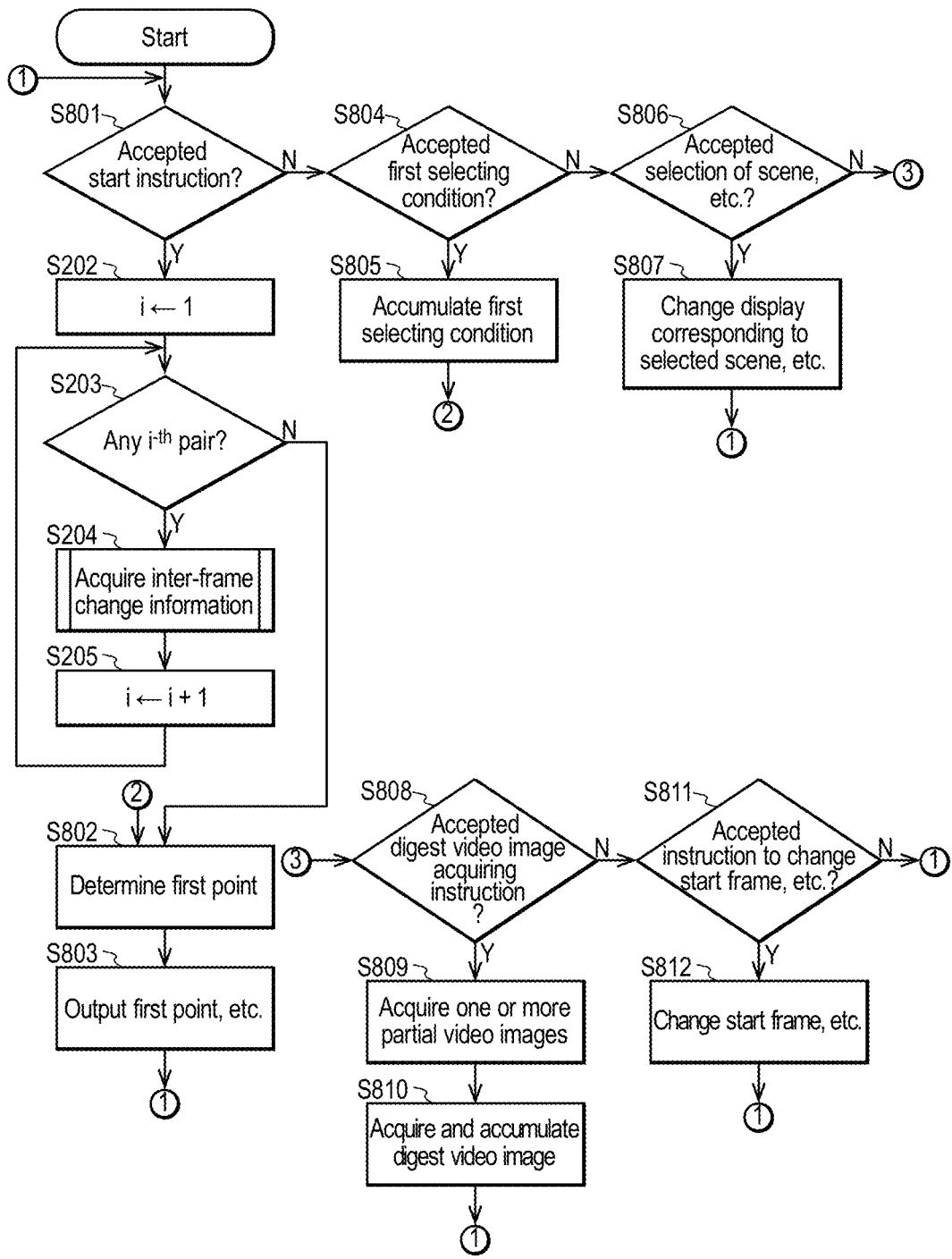
FIG. 8 is a flowchart illustrating an operation of the video image processing apparatus 2 in the embodiment.

In the flowchart in FIG. 8, if the accepting unit 22 has accepted the second selecting condition, the accumulating unit 233 may accumulate the second selecting condition in the selecting condition storage unit 112.

Furthermore, in step S805 of the flowchart in FIG. 8, after the first selecting condition has been accepted, the procedure advances to step S802, and thus the first point is changed using the change in the first selecting condition as a trigger, and the changed first point is output.

Furthermore, in the flowchart in FIG. 8, the accepting unit 22 may accept selection of a start frame or an end frame of a partial video image from a user.

Note that the procedure is terminated by powering off or an interruption at the end of the process in the flowchart in the flowchart in FIG. 8.

Hereinafter, a specific operation of the video image processing apparatus 2 in this embodiment will be described.

It is assumed that, in the storage unit 11, one video image that is to be edited is stored. The one video image is the same as the video image used in the description of the specific example in Embodiment 1, and is, for example, a video image having 18000 frames consisting of those with the frame numbers 0 to 17999. Hereinafter, two specific examples in this situation will be described. Specific Example 1 shows a case in which a scene start frame is automatically determined, and, if a user changes a first selecting condition for determining the scene start frame, the scene division is dynamically changed. Specific Example 2 shows a case in which a digest moving image is generated through scene selection by a user.

Specific Example 1

First, it is assumed that a user has input a start instruction to the video image processing apparatus 2. Next, the accepting unit 22 of the video image processing apparatus 2 accepts the start instruction. The change information acquiring unit 131 adds inter-frame change information "−1" to the storage unit 11 in association with the frame number 0.

Next, the change information acquiring unit 131 acquires a frame with the frame number 0 and a frame with the frame number 1 in the video image in the video image storage unit 111. The change information acquiring unit 131 acquires inter-frame change information indicating the degree of a change from the frame with the frame number 0 to the frame with the frame number 1, for example, through the divided region comparing processing described above. In this example, it is assumed that the change information acquiring unit 131 acquires divided region change information of each divided region of the frame with the frame number 0 and the frame with the frame number 1, acquires normalized inter-frame change information "1", using the divided region change information of each divided region. The change information acquiring unit 131 adds inter-frame change information "1" to the storage unit 11 in association with the frame number 1. The change information acquiring unit 131 acquires inter-frame change information expressed by an integer of any one of "0" to "9".

In a similar manner, it is assumed that the change information acquiring unit 131 acquires inter-frame change information "2" between the frame with the frame number 1 and the frame with the frame number 2, inter-frame change information "7" between the frame with the frame number 2 and the frame with the frame number 3, and the like, and accumulates them in the storage unit 11. The change information acquiring unit 131 performs the above-described processing to frames up to the last frame of the video image. It is assumed that the change information acquiring unit 131 has calculated inter-frame change information having a concept as shown in FIG. 5. The change information acquiring unit 131 has accumulated information of "ID", "frame number", and "inter-frame change information" in the inter-frame change information management table shown in FIG. 6.

Next, the user inputs the inter-frame change information "7" as the first selecting condition for determining the scene start frame. If the inter-frame change information input by the user is N (N is an integer of 0 to 9, in this example), the first selecting condition is "N≤inter-frame change information". The accepting unit 22 accepts the first selecting condition "7≤inter-frame change information". Next, the accumulating unit 233 accumulates the first selecting condition "7≤inter-frame change information" in the selecting condition storage unit 112.

Next, the point determining unit 231 selects frames corresponding to the first selecting condition "7≤inter-frame change information", from the inter-frame change information management table in FIG. 6. That is to say, the point determining unit 231 acquires the frame numbers "3", "6", and the like. Note that the frame corresponding to the inter-frame change information is a frame that is temporally after the two frames from which the inter-frame change information was calculated.

Next, the point output unit 241 outputs the first points of the frame numbers "3", "6", and the like determined by the point determining unit 231, in a visually recognizable manner. In this example, for example, as shown in FIG. 9, the point output unit 241 displays flags 901 and 902 respectively before the frame number "3" and before the frame number "6".

Figure 9:
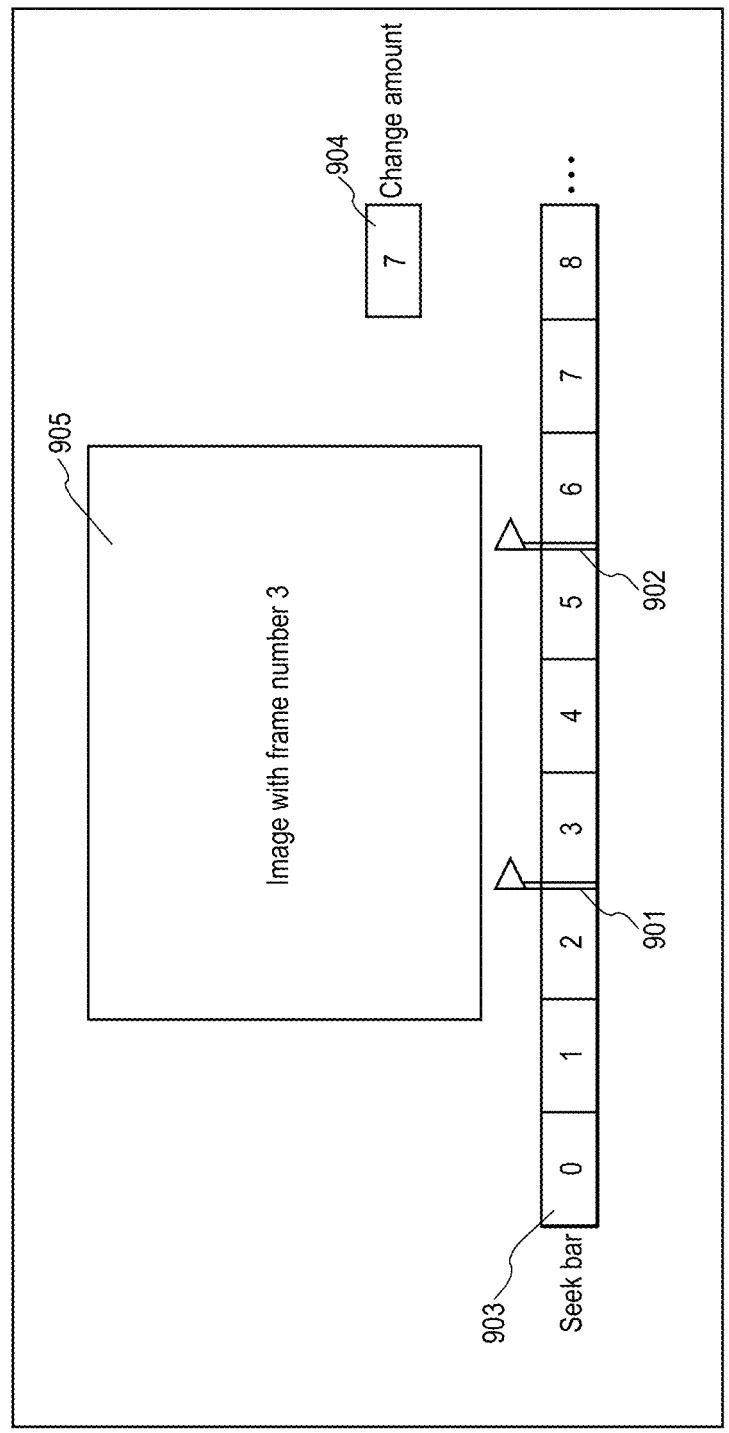
FIG. 9 is a diagram showing an output example in the embodiment.

Furthermore, as shown in FIG. 9, the output unit 24 displays a seek bar 903. The seek bar is a bar-like operation region that is displayed on a screen for editing or reproducing a moving image. The cells constituting the seek bar 903 display frame numbers. The output unit 24 displays the inter frame change information "7" input by the user, in a field 904. In FIG. 9, the field 904 has an item name "change amount". It is assumed that "change amount" is the same as the inter-frame change information. Furthermore, the partial video image output unit 242 displays the frame with the frame number "3" corresponding to the first flag, in a window 905. It is assumed that the first flag is referred to as a current flag.

Next, the user performs input to change the change amount in the field 904 in FIG. 9 from "7" to "2". Next, the accepting unit 22 accepts a new first selecting condition. The first selecting condition in this case is "2≤inter-frame change information".

Next, the point determining unit 231 selects frames corresponding to the first selecting condition "2≤inter-frame change information", from the inter-frame change information management table in FIG. 6. That is to say, the point determining unit 231 acquires the frame numbers "2", "3", "5", "6", and the like.

Next, the point output unit 241 outputs the first points of the frame numbers "2", "3", "5", "6", and the like determined by the point determining unit 231, in a visually recognizable manner. In this example, for example, as shown in FIG. 10, the point output unit 241 displays flags 1001, 1002, 1003, and 1004 respectively before the frame number "2", before the frame number "3", before the frame number "5", and before the frame number "6".

Figure 10:
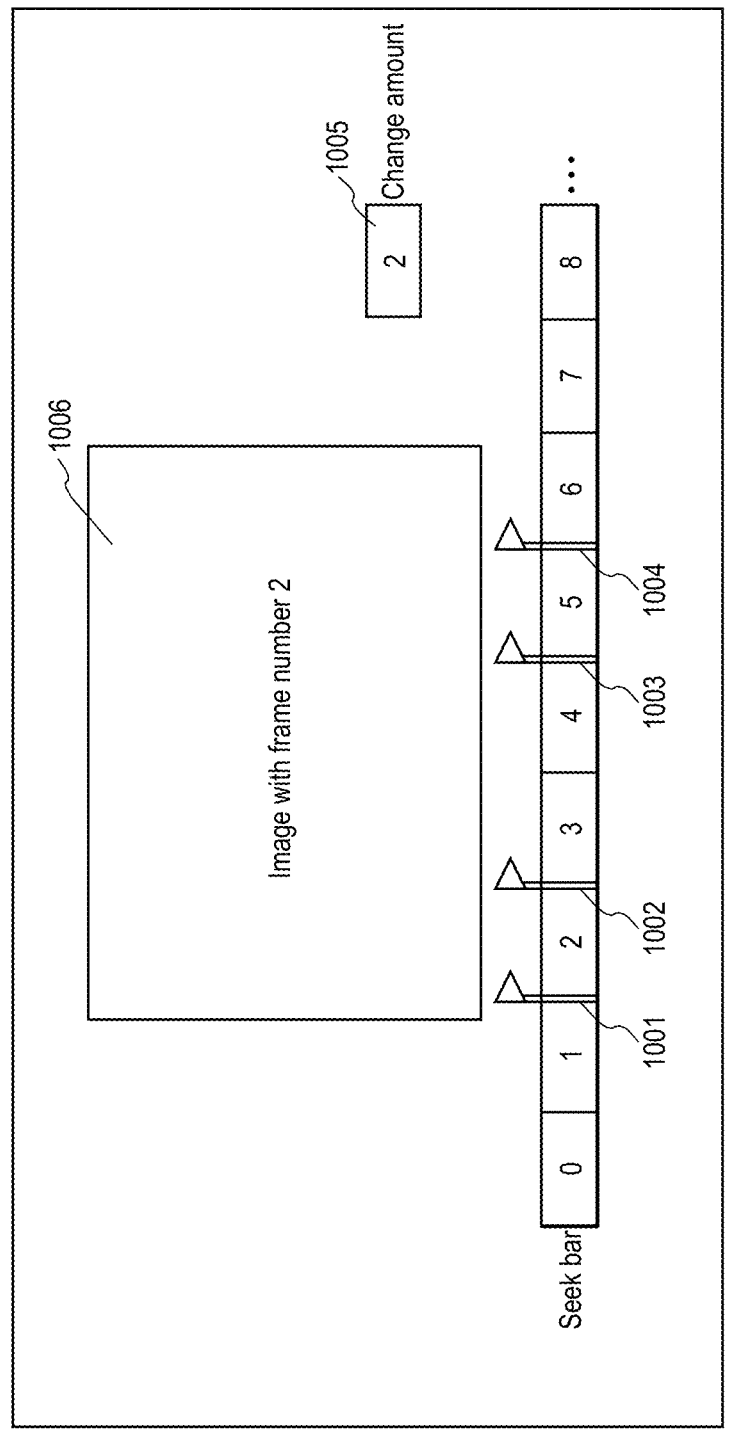
FIG. 10 is a diagram showing an output example in the embodiment.

Furthermore, as shown in FIG. 10, the output unit 24 displays a seek bar. The output unit 24 displays the inter-frame change information "2" input by the user, in a field 1005. Furthermore, the partial video image output unit 242 displays the frame with the frame number "2" corresponding to the first flag, in a window 1006.

As described above, if the user changes the change amount in the field 1005 from "7" to "2", the first selecting condition is changed. Then, in accordance with the change in the first selecting condition, the scene division is changed, and the display on the screen is changed from FIG. 9 to FIG. 10. The changing the scene division is changing a scene start frame.

Next, the user performs input to change the change amount in the field 1005 in FIG. 10 from "2" to "1". Next, the accepting unit 22 accepts a new first selecting condition. The first selecting condition in this case is "1≤inter-frame change information".

Next, the point determining unit 231 selects frames corresponding to the first selecting condition "1≤inter-frame change information", from the inter-frame change information management table in FIG. 6. That is to say, the point determining unit 231 acquires the frame numbers "1", "2", "3", "4", "5", "6", "8", and the like.

Next, the point output unit 241 outputs the first points of the frame numbers "1", "2", "3", "4", "5", "6", "8", and the like determined by the point determining unit 231, in a visually recognizable manner. In this example, for example, as shown in FIG. 11, the point output unit 241 displays flags 1101, 1102, 1103, 1104, 1105, 1106, and 1107 respectively before the frame number "1", before the frame number "2", before the frame number "3", before the frame number "4", before the frame number "5", before the frame number "6", and before the frame number "8".

Figure 11:
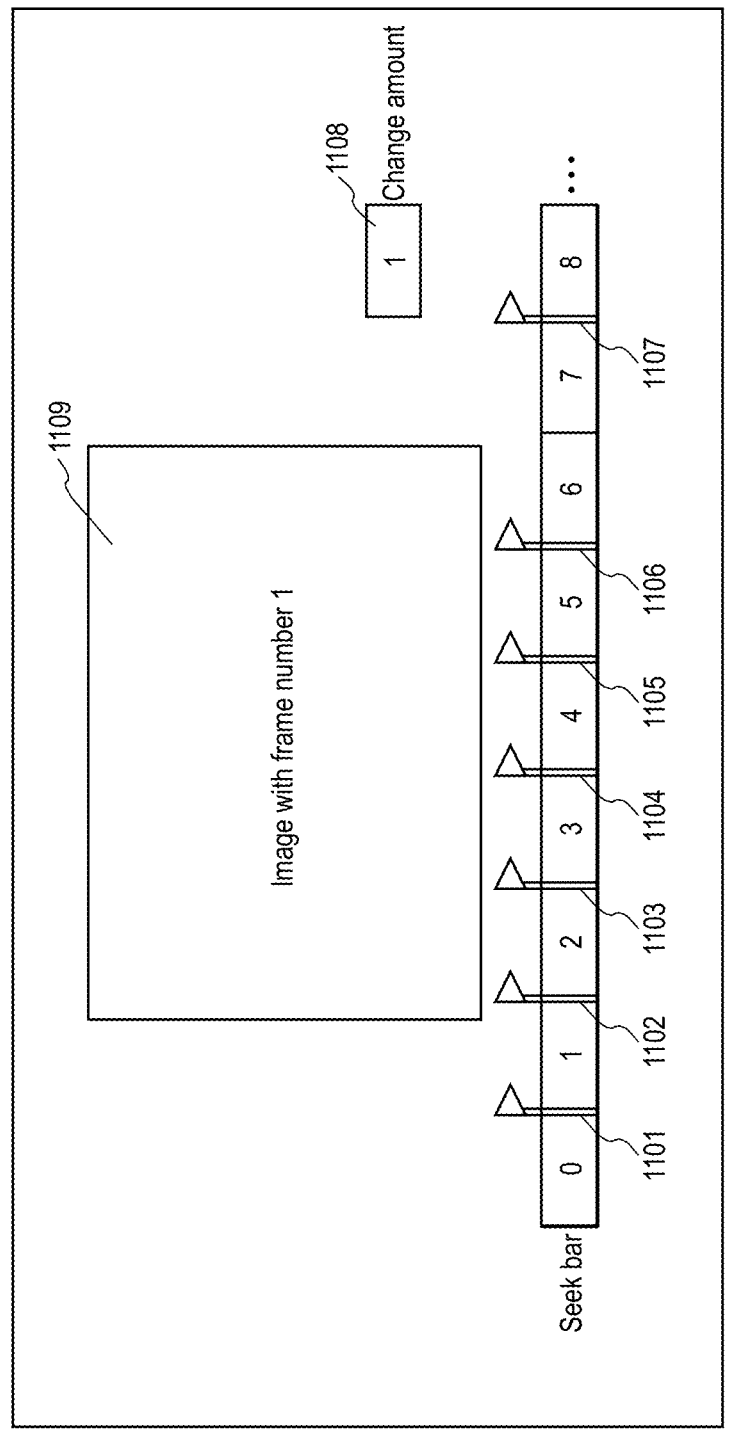
FIG. 11 is a diagram showing an output example in the embodiment.

Furthermore, as shown in FIG. 11, the output unit 24 displays a seek bar. The output unit 24 displays the inter-frame change information "1" input by the user, in a field 1108. Furthermore, the partial video image output unit 242 displays the frame with the frame number "1" corresponding to the first flag, in a window 1109.

As described above, if the user changes the change amount in field 1108 from "2" to "1", the first selecting condition is changed. Then, in accordance with the change in the first selecting condition, the scene division is changed, and the display on the screen is changed from FIG. 10 to FIG. 11.

As described above, according to this specific example, a user can easily change scene division. In this specific example, it will be appreciated that a user may select one or more partial video images from a screen in FIG. 9, 10, 11, or the like as in Specific Example 2 described later, and acquire and accumulate a digest video image constituted by the selected one or more partial video images.

Specific Example 2

It is assumed that the first selecting condition "8≤inter-frame change information" is stored in the selecting condition storage unit 112. In this situation, it is assumed that a user has input a start instruction to the video image processing apparatus 2.

Next, the accepting unit 22 of the video image processing apparatus 2 accepts the start instruction. The change information acquiring unit 131 calculates inter-frame change information having a concept as shown in FIG. 5 through the processing described in Specific Example 1. The change information acquiring unit 131 accumulates information of "ID", "frame number", and "inter-frame change information" in the inter-frame change information management table shown in FIG. 6.

Figure 12:
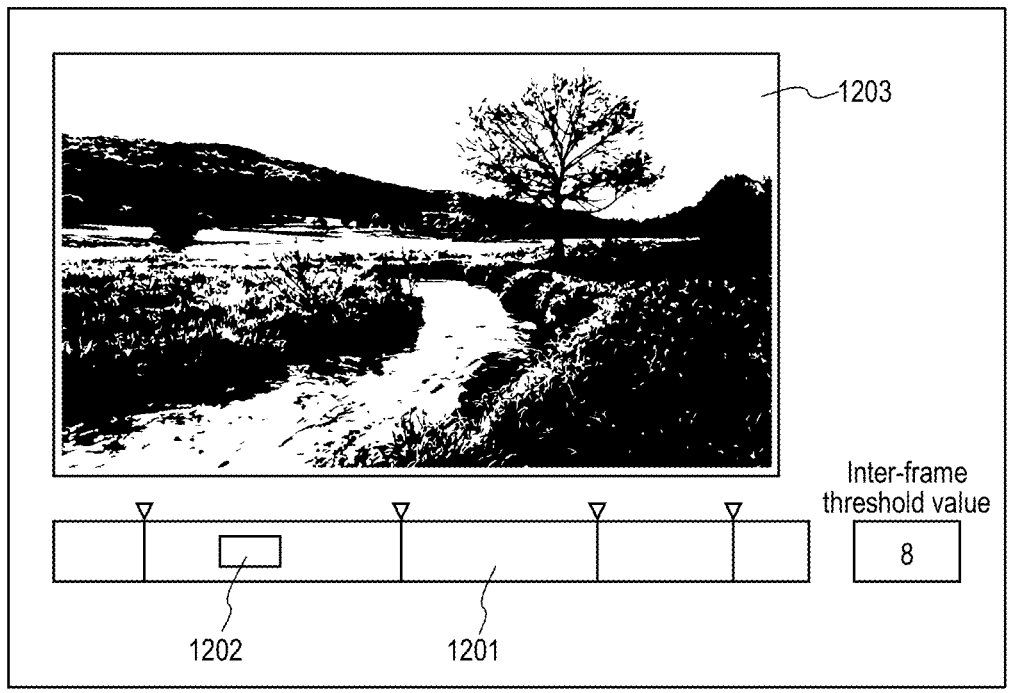
FIG. 12 is a diagram showing an output example in the embodiment.

Next, the point determining unit 231 selects frames corresponding to the first selecting condition "8≤inter-frame change information", from the inter-frame change information management table in FIG. 6. That is to say, the point determining unit 231 acquires the frame number "6" and the like. Next, the point output unit 241 outputs the first points of the frame number "6" and the like determined by the point determining unit 231, in a visually recognizable manner. In this example, for example, as shown in FIG. 12, the point output unit 241 displays a flag before the frame number "6". The output unit 24 displays a seek bar. In FIG. 12, for example, 1202 denotes a bar showing a relative position (a position in a video image) of a frame that is being output. In 1203 of FIG. 12, the frame corresponding to 1202 is being output.

Next, for example, the user clicks on a point in the region corresponding to a scene 1201 on the seek bar, from the screen in FIG. 12. That is to say, the user has input selection of the scene 1201.

Figure 13:
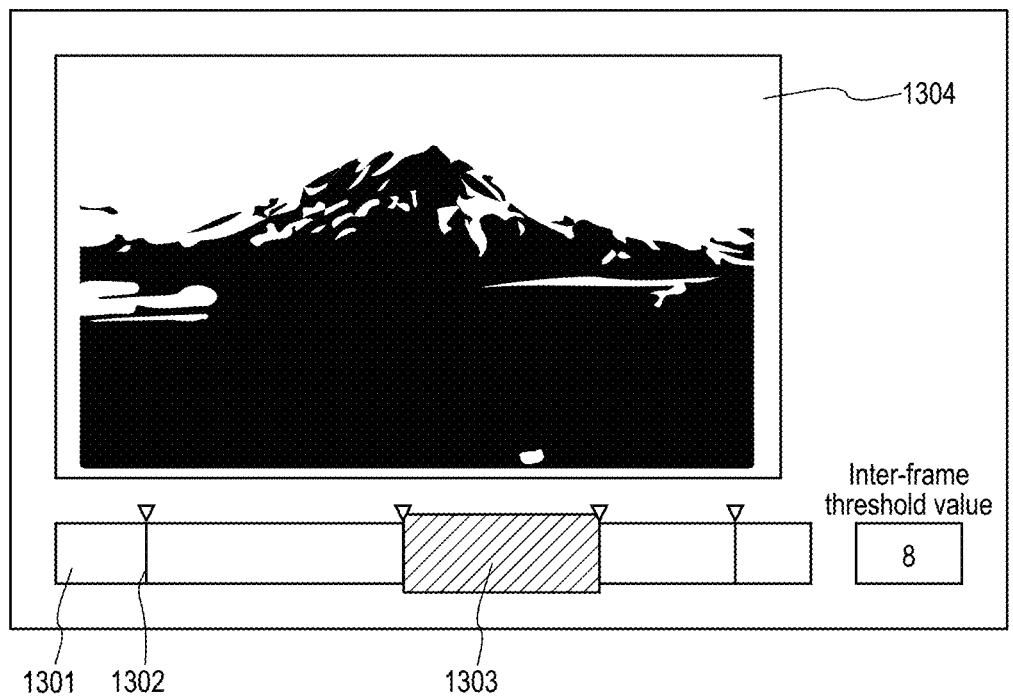
FIG. 13 is a diagram showing an output example in the embodiment.

Then, the accepting unit 22 accepts selection of the scene 1201. The point output unit 241 outputs display corresponding to the scene 1201 in an emphasized manner, compared with display corresponding to another scene. The point output unit 241 typically changes an attribute value (e.g., color, shape, background, contour, etc.) of the region of the selected scene, and performs display so as to emphasize that scene. FIG. 13 shows a screen example after the scene 1201 has been selected. In FIG. 13, 1301 denotes a seek bar, 1302 denotes a scene start flag, and 1303 denotes an example in which the selected scene is displayed in an emphasized manner. In this example, it is assumed that the point output unit 241 displays, for example, the cell of the scene 1303 in a shaded manner and in an enlarged width. There is no limitation on the method in which the point output unit 241 outputs the selected scene in an emphasized manner. The partial video image output unit 242 displays the start frame of the scene 1303, as shown in 1304.

Through the above-described processing, a partial video image that is the scene 1303 is selected. Those that are selected are not limited to a scene, but also may be part of a scene. In order to output a scene or the like in an emphasized manner, typically, it is sufficient that one or more attribute values of the region of the selected scene are different from those of the other regions.

Furthermore, the user inputs an instruction to jump a frame corresponding to a flag, to the video image processing apparatus 2. Then, the accepting unit 22 accepts the instruction to jump between scenes. In response to the instruction to jump between scenes, the output unit 24 changes display of the seek bar. That is to say, the output unit 24 moves and displays the seek bar so as to display a current flag corresponding to the scene that is a jump destination. The partial video image output unit 242 displays a frame corresponding to the current flag, in the window 905. The current flag is a start flag of a current scene.

The user sees the scene start frame or reproduces part or the whole of the scene, and determines a partial video image that is to constitute a digest video image. That is to say, the user inputs an instruction to select a scene or a partial video image from which he or she wants to construct a digest video image. The accepting unit 22 accepts the selection of one scene or one partial video image.

It is assumed that, in order to select the partial video image for part of the scene, the user has input an instruction to select an end frame of the partial video image. The accepting unit 22 accepts the instruction to select an end frame of a partial video image. The processing unit 23 accumulates the frame number of the selected end frame as an end flag, in association with the corresponding start flag. The output unit 24 displays an end flag in association with the selected end frame. It is preferable that the end flag is displayed in a display mode (a pattern, a color, etc.) different from that of the start flag.

Next, the user inputs a digest video image acquiring instruction to the video image processing apparatus 2. Next, the accepting unit 22 accepts the digest video image acquiring instruction.

Next, the partial video image acquiring unit 232 acquires selected one or more partial video images. The partial video image is a scene or part of a scene, and is a video image constituted by frames from a frame corresponding to a start flag to a frame corresponding to an end frame or a frame before the next start frame. Next, the accumulating unit 233 acquires and accumulates a digest video image having the acquired one or more partial video images.

Through the above-described processing, a user can easily acquire a digest video image.

As described above, according to this embodiment, it is possible to clearly indicate a scene switching point as appropriate. According to this embodiment, it is possible to dynamically change a scene switching point, and clearly indicate it as appropriate. According to this embodiment, a partial video image that is a scene or part of a scene is easily selected. Furthermore, according to this embodiment, it is possible to easily acquire a digest video image.

The software that realizes the digest video image processing apparatus in this embodiment may be the following sort of program. Specifically, this program is a program for causing a computer to function as: a change information acquiring unit that acquires inter-frame change information, which is information indicating a change between two or more frames, among two or more frames constituting a video image; a point determining unit that, in a case where the inter-frame change information is information indicating a change that is large enough to satisfy a predetermined condition, determines a first point corresponding to the inter-frame change information; and a point output unit that outputs a point in the video image that is the first point determined by the point determining unit, in a visually recognizable manner.

Furthermore, in this program, it is preferable to cause the computer to function such that the change information acquiring unit acquires two or more feature values related to a change between two frames, and acquires inter-frame change information, using the two or more feature values.

Furthermore, in this program, it is preferable to cause the computer to further function as: an accepting unit that accepts a first selecting condition related to the predetermined condition, wherein the point determining unit determines, in a case where the inter-frame change information is information indicating a change that is large enough to satisfy the first selecting condition, a first point corresponding to the inter-frame change information.

Furthermore, in this program, it is preferable to cause the computer to function such that the accepting unit accepts selection of one scene from among two or more scenes that are segmented by one or two first points output by the point output unit, and the point output unit outputs display corresponding to one scene corresponding to the selection accepted by the accepting unit, in an emphasized manner, compared with display corresponding to another scene.

Furthermore, in this program, it is preferable to cause the computer to further function as: a partial video image output unit that outputs a partial video image corresponding to one scene corresponding to the selection accepted by the accepting unit.

Embodiment 3

In this embodiment, a video image processing apparatus will be described that divides a screen, and simultaneously reproduces two or more scenes in the divided screens.

Furthermore, in this embodiment, a video image processing apparatus will be described that changes the number of scenes according to an accepted first selecting condition, wherein the number of screens into which a screen is divided varies in accordance with the number of scenes.

Furthermore, in this embodiment, a video image processing apparatus will be described that accepts selection one or more divided screens from among two or more divided screens, acquires a partial video image corresponding to the divided screens selection of which was accepted, and constructs a digest video image.

Figure 14:
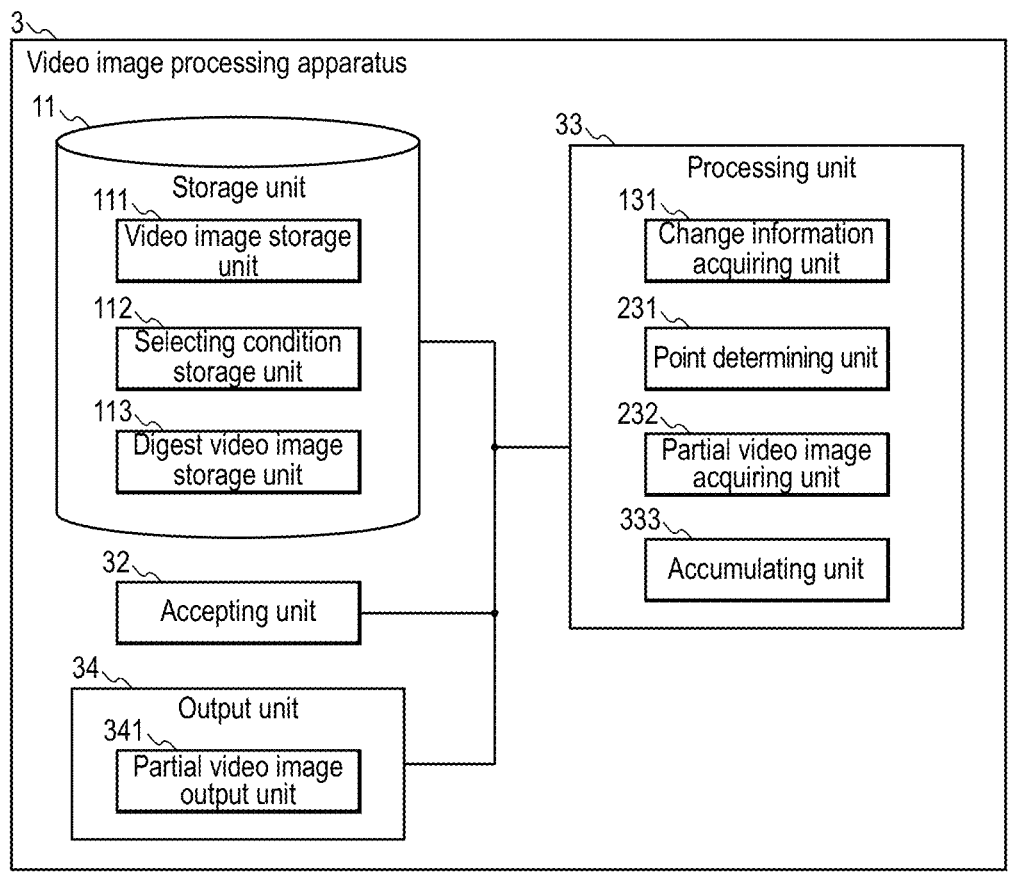
FIG. 14 is a block diagram of a video image processing apparatus 3 in Embodiment 3.

FIG. 14 is a block diagram of a video image processing apparatus 3 in this embodiment. The video image processing apparatus 3 includes the storage unit 11, an accepting unit 32, a processing unit 33, and an output unit 34.

The processing unit 33 includes the change information acquiring unit 131, the point determining unit 231, the partial video image acquiring unit 232, and an accumulating unit 333. The output unit 34 includes a partial video image output unit 341.

The accepting unit 32 accepts various types of instructions, information, and the like. The various types of instructions, information, and the like are, for example, the first selecting condition. The various types of instructions, information, and the like are, for example, an instruction to select a divided screen. The instruction to select a divided screen also may be referred to as an instruction to select a partial video image. The accepting unit 32 accepts an instruction to select one or at least two divided screens from among two or more divided screens.

The various types of instructions, information, and the like may be input via any part such as a keyboard, a mouse, a menu screen, or the like. The accepting unit 32 may be realized by a device driver for an input part such as a keyboard, or control software for a menu screen, for example.

The processing unit 33 performs various types of processing. The various types of processing are, for example, processing that is performed by the change information acquiring unit 131, the point determining unit 231, the partial video image acquiring unit 232, the accumulating unit 333, and the like.

The accumulating unit 333 accumulates a digest video image having one or more partial video images acquired by the partial video image acquiring unit 232.

The output unit 34 outputs the various types of information. The various types of information are, for example, a partial video image. The output unit 34 may output a field or the like to which a later-described inter-frame threshold value is input.

The partial video image output unit 341 simultaneously reproduces two or more partial video images respectively corresponding to scenes that are segmented by one or two first points, on divided screens. The divided screens are regions that are divided in a screen.

It is preferable that the partial video image output unit 341 simultaneously reproduces partial video images respectively corresponding to two or more scenes that are segmented by one or two first points, on divided screens divided according to the number of scenes corresponding to the number of first points. The partial video image output unit 341 may repeatedly reproduce partial video images on the divided screens. The technique for simultaneously reproducing different video images on multiple divided screens (windows) is a known technique, and thus a detailed description thereof has been omitted.

For example, the partial video image output unit 341 determines the number of divided screens according to the number of scenes corresponding to the number of first points, and simultaneously reproduces two or more partial video images respectively corresponding to all scenes that are segmented by one or two first points, on divided screens in a number that matches the number of divided screens. The number of scenes corresponding to the number of first points is typically "number of first points+1". For example, two or more pairs of the number of scenes and divided screen form information are stored in the storage unit 11 as described above, and the partial video image output unit 341 searches the storage unit 11 using, as a key, the number of scenes corresponding to the number of first points, and acquires divided screen form information. The divided screen form information is, for example, information such as the number of divided screens, "n×m (each of n and m is a natural number, wherein n is the number of portions into which the screen is divided in the horizontal direction, and m is the number of portions into which the screen is divided in the vertical direction)", or the like.

The partial video image output unit 341 outputs a divided screen corresponding to one partial video image corresponding to the selection accepted by the accepting unit 32, in an emphasized manner, compared with a divided screen corresponding to another partial video image. The emphasized manner is, for example, that an attribute value (an attribute value of a frame line, an attribute value of a background, etc.) of a divided screen is different from that of the other divided screens.

The processing unit 33, the change information acquiring unit 131, the point determining unit 231, the partial video image acquiring unit 232, and the accumulating unit 333 may be realized typically by MPUs, memories, or the like. Typically, the processing procedure of the processing unit 33 and the like is realized by software, and the software is stored in a storage medium such as a ROM. Note that the processing procedure of the processing unit 33 and the like may be realized also by hardware (dedicated circuits).

The output unit 34 and the partial video image output unit 341 may be considered to include or not to include an output device such as a display screen or a speaker. The output unit 34 and the like may be realized, for example, by driver software for an output device, a combination of driver software for an output device and the output device, or the like.

Next, an operation the video image processing apparatus 3 will be described with reference to the flowchart in FIG. 15. In the flowchart in FIG. 15, a description of the same steps as those in the flowchart in FIG. 2 or 8 is omitted.

(Step S1501) The partial video image output unit 341 acquires the number of first points determined by the point determining unit 231. Next, the partial video image output unit 341 acquires the number of scenes, which is the number of first points+1. Next, the partial video image output unit 341 determines the number of divided screens according to the number of scenes. The partial video image output unit 341 may determine that the number of divided screens is the same as the number of scenes, or that the number of divided screens is "n×m" that satisfies "n×m≤number of scenes (each of n and m is a natural number, wherein n is the number of portions into which the screen is divided in the horizontal direction, and m is the number of portions into which the screen is divided in the vertical direction)", wherein "n×m− number of scenes" has the smallest value, for example.

(Step S1502) The partial video image output unit 341 reproduces a partial video image. The partial video image reproducing processing will be described with reference to the flowchart in FIG. 16.

(Step S1503) The accepting unit 32 determines whether or not it has accepted selection of one scene or the like from among the two or more scenes and the like that are output by the partial video image output unit 341 on the divided screens. If it has accepted selection of one scene or the like, the procedure advances to step S1504, and, if not, the procedure advances to step S808. The scene or the like is a video image of a scene or part of a scene. Note that, before accepting selection of a video image of part of a scene, it is necessary that the last frame of the video image of part of the scene has been determined. The last frame of the video image of part of the scene may be automatically determined using the second selecting condition as described in Embodiment 1, or may be determined according to an instruction from a user. A video image of part of a scene is a partial video image. A scene also may be referred to as a partial video image.

(Step S1504) The partial video image output unit 341 changes the display corresponding to the selected scene or the like such that it is visually recognizable that the scene or the like has been selected. The procedure returns to step S801.

Figure 15:
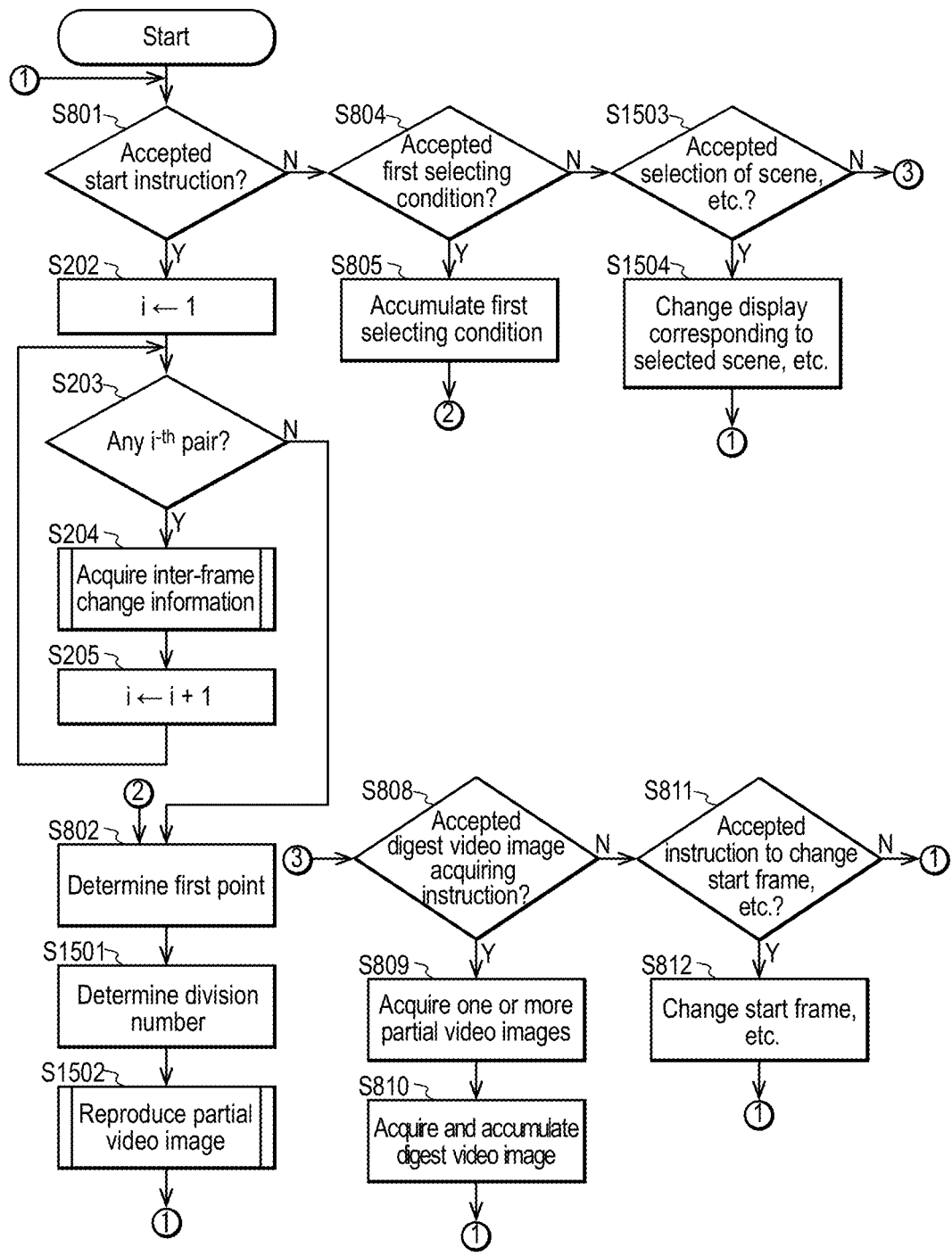
FIG. 15 is a flowchart illustrating an operation of the video image processing apparatus 3 in the embodiment.

Note that the procedure is terminated by powering off or an interruption at the end of the process in the flowchart in FIG. 15.

Figure 16:
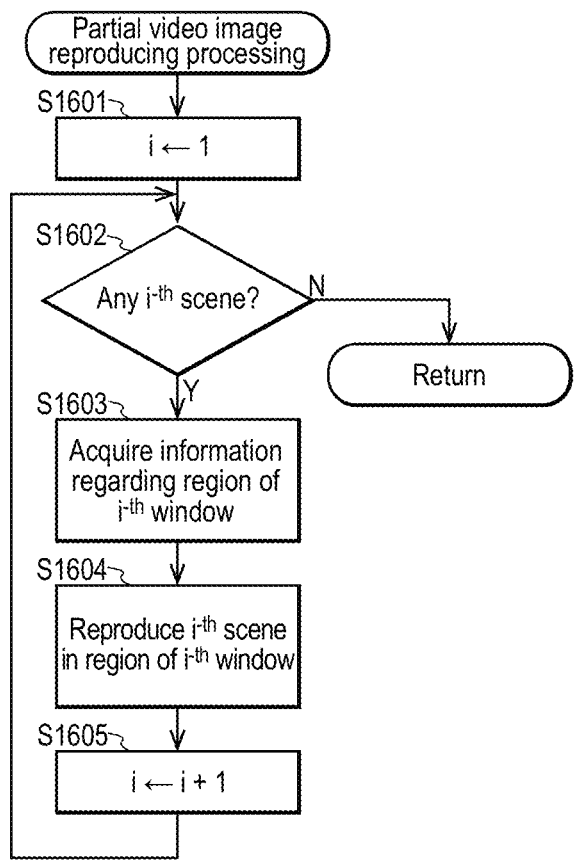
FIG. 16 is a flowchart illustrating partial video image reproducing processing in the embodiment.

Next, the partial video image reproducing processing in step S1502 will be described with reference to the flowchart in FIG. 16.

(Step S1601) The partial video image output unit 341 substitutes 1 for a counter i.

(Step S1602) The partial video image output unit 341 determines whether or not there is an $i^{-th}$ scene in a video image that is to be reproduced. If there is an $i^{-th}$ scene, the procedure advances to step S1603, and, if not, the procedure returns to the upper-level processing. The partial video image output unit 341 determines that there is an $i^{-th}$ scene, for example, in the case where i is 1 or there is information regarding an $(i-1)^{-th}$ first point. The partial video image output unit 341 may sequentially acquire partial video images constituting the $i^{-th}$ scene from the video image that is to be reproduced, and determine that there is the $i^{-th}$ scene until the last frame of the video image is acquired. The information regarding the first points is acquired by the point determining unit 231 and stored at least in an unshown buffer or the storage unit 11.

(Step S1603) The partial video image output unit 341 acquires information regarding a region of an $i^{-th}$ window (divided region) in the divided regions of the screen. The information regarding a region is, for example, an upper left coordinate and a lower right coordinate of a window.

(Step S1604) The partial video image output unit 341 reproduces the video image of the $i^{-th}$ scene, in the region of the window corresponding to information regarding the region of the window acquired in step S1603.

(Step S1605) The partial video image output unit 341 increments the counter i by 1. The procedure returns to step S1602.

Hereinafter, a specific operation of the video image processing apparatus 3 in this embodiment will be described.

It is assumed that, in the storage unit 11, one video image that is to be edited is stored. The one video image is the same as the video image used in the description of the specific example in Embodiment 1, and is, for example, a video image having 18000 frames consisting of those with the frame numbers 0 to 17999.

Hereinafter, two specific examples in this situation will be described. Specific Example 1 shows a case in which a scene start frame is automatically determined, and, if a user changes a first selecting condition for determining the scene start frame, the scene division is dynamically changed. Specific Example 2 shows a case in which a digest moving image is generated through scene selection by a user.

Specific Example 1

First, it is assumed that a user has input a start instruction to the video image processing apparatus 3. Next, the accepting unit 32 of the video image processing apparatus 3 accepts the start instruction. As described in Embodiment 2, the change information acquiring unit 131 acquires, for each pair of frames, inter-frame change information between two frames. The change information acquiring unit 131 accumulates information, for example, in the inter-frame change information management table shown in FIG. 6.

Next, the user inputs a threshold value "8" of the inter-frame change information, as a first selecting condition for determining the scene start frame. The accepting unit 32 accepts the first selecting condition "8≤inter-frame change information". Next, the accumulating unit 333 accumulates the first selecting condition "8≤inter-frame change information" in the selecting condition storage unit 112.

Next, the point determining unit 231 selects frames corresponding to the first selecting condition "8≤inter-frame change information", from the inter-frame change information management table in FIG. 6. That is to say, the point determining unit 231 acquires the frame number "6" and the like. Note that the one or more frame numbers acquired by the point determining unit 231 are information indicating first points.

Next, the partial video image output unit 341 acquires the number of first points acquired by the point determining unit 231. It is assumed that the partial video image output unit 341 acquires the number of first points "8". The partial video image output unit 341 acquires the number of scenes "8+1=9".

Next, the partial video image output unit 341 determines the number of divided screens according to the number of scenes "9". In this case, the partial video image output unit 341 acquires divided screen information "3×3" (indicating that a screen is to be divided into three portions in the horizontal direction and three portions in the vertical direction). Note that, for example, in the storage unit 11, a pair of pieces of information consisting of the number of scenes and divided screen information are stored, and the partial video image output unit 341 acquires information regarding divided screens corresponding to the number of scenes "9", from the storage unit 11. The divided screen information is, for example, "m×m", a group of information (e.g., an upper left coordinate and a lower right coordinate of each divided region) for specifying divided regions, or the like.

Figure 17:
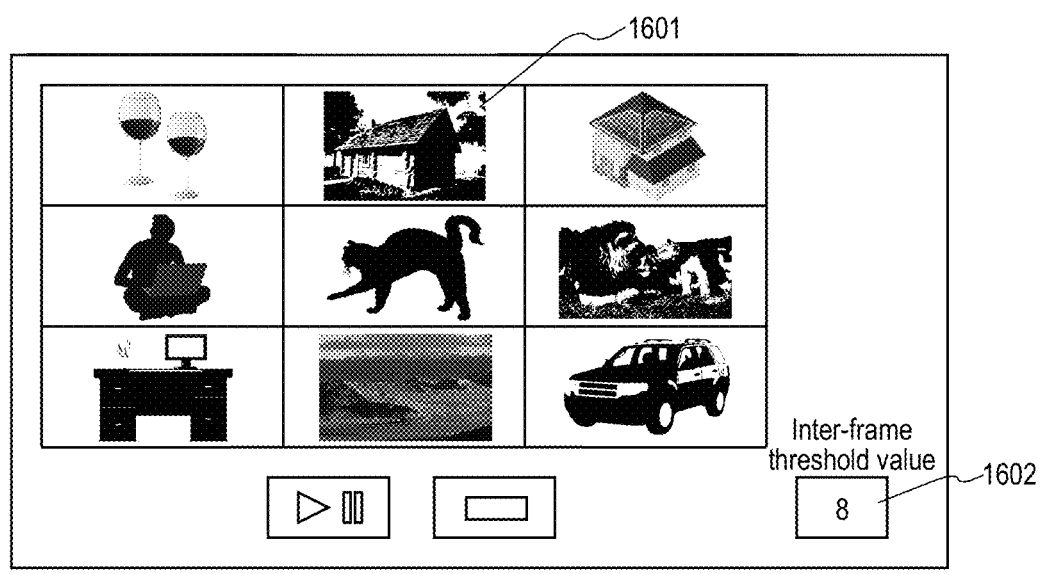
FIG. 17 is a diagram showing an output example in the embodiment.

Next, the partial video image output unit 341 performs the partial video image reproducing processing. That is to say, nine scenes are reproduced in their corresponding divided regions from among the nine divided regions. The nine scenes are, for example, simultaneously and repeatedly reproduced. FIG. 17 shows an output example thereof. In FIG. 17, on the partial video image reproducing screen, the scenes are simultaneously reproduced in the nine divided regions (see 1601, etc.). The threshold value "8" that is a threshold value input by the user and constituting the first selecting condition is displayed in a filed 1602.

Next, it is assumed that the user has changed the threshold value of the inter-frame change information from "8" to "6", as the first selecting condition. The accepting unit 32 accepts the first selecting condition "6≤inter-frame change information". Next, the accumulating unit 333 accumulates the first selecting condition "6≤inter-frame change information", in the selecting condition storage unit 112.

Next, the point determining unit 231 selects frames corresponding to the first selecting condition "6≤inter-frame change information", from the inter-frame change information management table in FIG. 6. That is to say, the point determining unit 231 acquires the frame numbers "3", "6", and the like. Note that the one or more frame numbers acquired by the point determining unit 231 are information indicating first points.

Next, the partial video image output unit 341 acquires the number of first points acquired by the point determining unit

231. It is assumed that the partial video image output unit 341 acquires the number of first points "13". The partial video image output unit 341 acquires the number of scenes "13+1=14".

Next, the partial video image output unit 341 determines the number of divided screens according to the number of scenes "14". In this case, the partial video image output unit 341 acquires divided screen information "4×4" (indicating that a screen is to be divided into four portions in the horizontal direction and four portions in the vertical direction).

Figure 18:
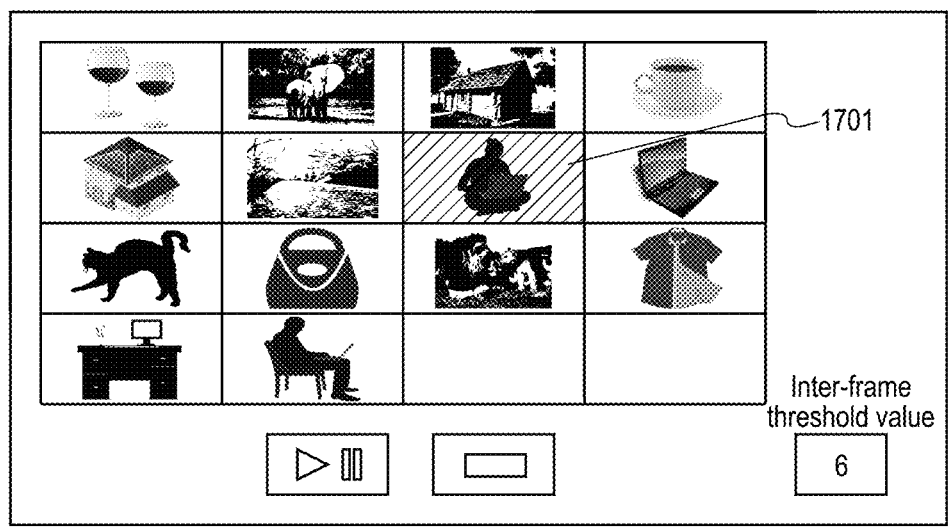
FIG. 18 is a diagram showing an output example in the embodiment.

Next, the partial video image output unit 341 performs the partial video image reproducing processing. That is to say, 14 scenes are reproduced in their corresponding divided regions from among the 16 divided regions. The 14 scenes are, for example, simultaneously and repeatedly reproduced. FIG. 18 shows an output example thereof. In FIG. 18, on the partial video image reproducing screen, the scenes are simultaneously reproduced in the 14 divided regions. No partial video image is being reproduced in two divided region.

Next, it is assumed that the user has changed the threshold value of the inter-frame change information from "6" to "1", as the first selecting condition. The accepting unit 32 accepts the first selecting condition "1≤inter-frame change information". Next, the accumulating unit 333 accumulates the first selecting condition "1≤inter-frame change information", in the selecting condition storage unit 112.

Next, the point determining unit 231 selects frames corresponding to the first selecting condition "1≤inter-frame change information", from the inter-frame change information management table in FIG. 6. That is to say, the point determining unit 231 acquires the frame numbers "1", "2", "3", "4", "5", "6", "8", and the like. Note that the one or more frame numbers acquired by the point determining unit 231 are information indicating first points.

Next, the partial video image output unit 341 acquires the number of first points acquired by the point determining unit 231. It is assumed that the partial video image output unit 341 acquires the number of first points "107". The partial video image output unit 341 acquires the number of scenes "107+1=108".

Next, the partial video image output unit 341 determines the number of divided screens according to the number of scenes "108". In this case, the partial video image output unit 341 acquires divided screen information "5×5" (indicating that a screen is to be divided into five portions in the horizontal direction and five portions in the vertical direction). It is assumed that, in this specific example, th division form with the largest division number is "5×5".

Figure 19:
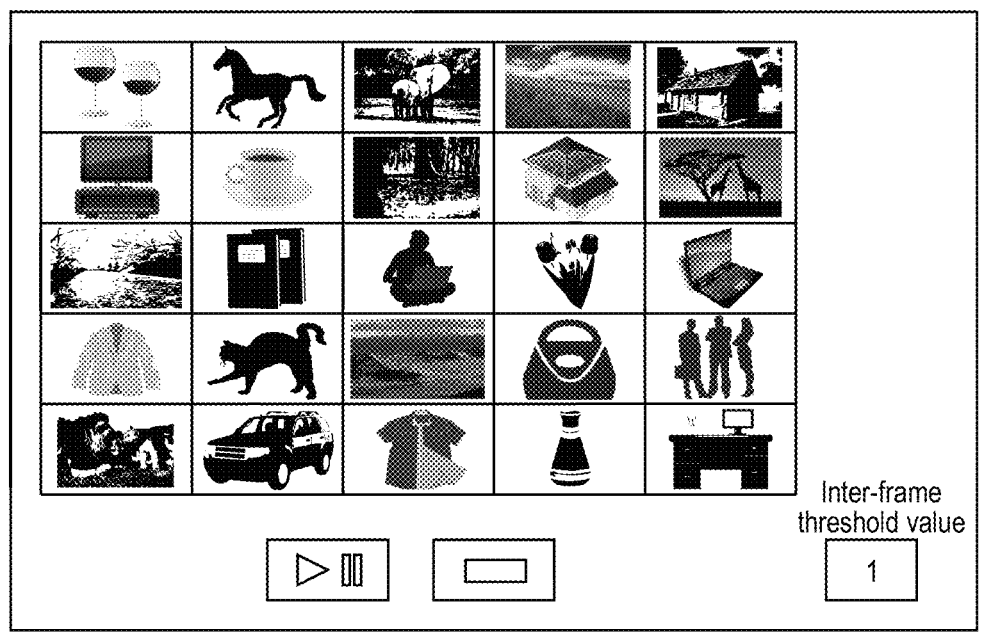
FIG. 19 is a diagram showing an output example in the embodiment.

Next, the partial video image output unit 341 performs the partial video image reproducing processing. That is to say, the partial video image output unit 341 sequentially reproduces 108 scenes from the first scene in the 25 divided regions. At that time, the partial video image output unit 341 are not reproducing the 26$^{-th}$ and subsequent scenes. FIG. 19 shows an output example thereof.

In FIG. 19, if the user pushes a button (not shown) for switching screens for reproducing and displaying the next scene group, the accepting unit 32 accepts the screen switching instruction. Upon accepting the screen switching instruction, the partial video image output unit 341 displays a screen for simultaneously reproducing the 26$^{-th}$ to 50$^{-th}$ scenes in the 25 divided regions.

As described above, in this specific example, a user can easily change scene division. A screen is divided into multiple windows according to the number of scenes, and multiple scenes are simultaneously reproduced. In this specific example, it will be appreciated that a user may select one or more partial video images (also referred to as "scenes" in this example) from a screen in FIG. 17, 18, 19, or the like as in Specific Example 2 described later, and acquire and accumulate a digest video image constituted by the selected one or more partial video images.

Specific Example 2

It is assumed that the first selecting condition "6≤inter-frame change information" is stored in the selecting condition storage unit 112, and, as shown in FIG. 18, 14 scenes are simultaneously and repeatedly reproduced in "4 ×4" divided regions.

In this situation, a user selects a scene that he or she wants to include in a digest video image while viewing moving images of multiple scenes that are being reproduced. It is assumed that the user designates a divided region 1701. The accepting unit 32 accepts selection of a scene or the like that is being reproduced in the divided region 1701 from among the two or more scenes and the like that are output by the partial video image output unit 341 on the divided screens.

Next, the partial video image output unit 341 changes the display corresponding to the divided region 1701 such that it is visually recognizable that the scene or the like has been selected. In this example, it is assumed that the partial video image output unit 341 displays the divided region 1701 in a shaded manner.

The user designates other divided regions as well. The accepting unit 32 accepts selection of scenes or the like that are being reproduced in the designated divided regions.

Next, the user inputs a digest video image acquiring instruction. The accepting unit 32 accepts the digest video image acquiring instruction.

Next, the partial video image acquiring unit 232 acquires the selected one or more scenes. The accumulating unit 333 constructs a digest video image having the one or more scenes acquired by the partial video image acquiring unit 232 and accumulates it in the digest video image storage unit 113.

As described above, in this specific example, a user can select a partial video image while viewing partial video images that are being reproduced in divided regions. Then, a digest video image having the selected one or at least two partial video images can be automatically constructed and accumulated.

As described above, according to this embodiment, it is possible to clearly indicate a scene switching point in a video image as appropriate. According to this embodiment, it is possible to dynamically change a scene switching point, and clearly indicate it as appropriate. According to this embodiment, it is possible to easily select a scene. According to this embodiment, it is possible to simultaneously reproduce partial video images respectively corresponding to two or more scenes. According to this embodiment, it is possible to divide a video image into scenes corresponding to an input condition, and simultaneously reproduce partial video images corresponding to all scenes. Furthermore, according to this embodiment, it is possible to clearly indicate a selected partial video image.

Figure 20:
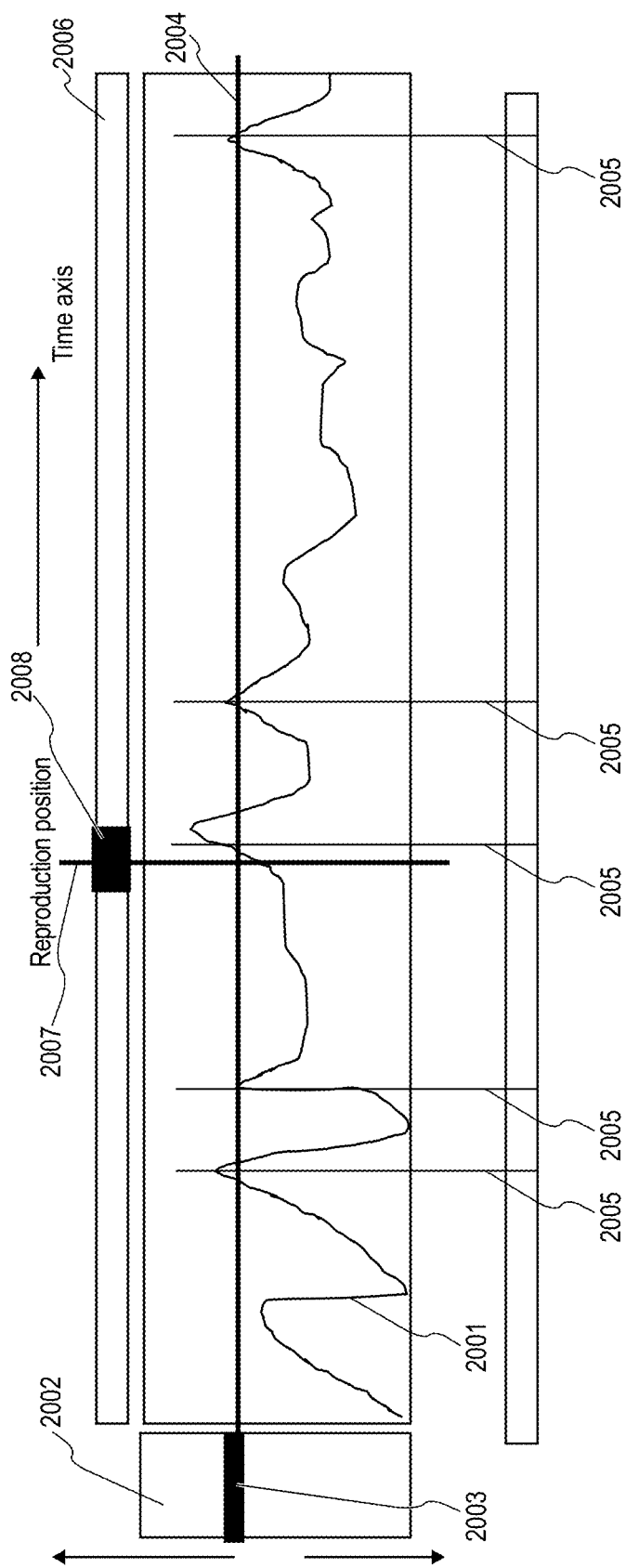
FIG. 20 is a diagram showing an output example in the embodiment.

In FIGS. 17 to FIG. 19 in the above-described specific examples, the first selecting condition was an inter-frame threshold value input as a numeric value. However, input of the first selecting condition may be graphical input through an intuitive operation using a pattern (also referred to as a graphic) such as a slider bar as shown in FIG. 20. In FIG. 20, 2001 denotes a graph obtained by connecting, via lines, pieces of inter-frame change information between frames constituting a video image. In the graph, 2002 denotes an interface that is used for inputting a first selecting condition and is a slider bar, and 2003 denotes a bar for inputting the first selecting condition, wherein the position of 2004 expresses a threshold value of a start frame constituting a scene or a partial video image. In the graph 2001 in FIG. 20, the vertical axis indicates an axis for inter-frame change information, and the horizontal axis indicates a time axis.

In FIG. 20, five frames 2005 or six frames obtained by adding a start frame of a video image and the five frames 2005 are start frames constituting scenes or partial video images. In FIG. 20, a frame at a change from a frame at which the inter-frame change information is smaller than the threshold value of the inter-frame change information indicated by 2004 to a frame at which the inter-frame change information is at the threshold value of the inter-frame change information or more is a start frame constituting a scene or a partial video image.

Furthermore, 2006 denotes a seek bar for indicating and adjusting a reproduction position of a video image, 2007 denotes a bar showing the reproduction position of the video image, and 2008 denotes a bar for moving the reproduction position.

Furthermore, the software that realizes the video image processing apparatus 3 in this embodiment may be the following sort of program. Specifically, this program is a program for causing a computer to function as: a change information acquiring unit that acquires inter-frame change information, which is information indicating a change between two or more frames, among two or more frames constituting a video image; a point determining unit that, in a case where the inter-frame change information is information indicating a change that is large enough to satisfy a predetermined condition, determines a first point corresponding to the inter-frame change information; and a partial video image output unit that simultaneously reproduces two or more partial video images respectively corresponding to scenes that are segmented by one or two first points, on divided screens, which are regions divided in a screen.

Furthermore, in this program, it is preferable to cause the computer to further function as: an accepting unit that accepts a first selecting condition related to the predetermined condition, wherein the point determining unit determines, in a case where the inter-frame change information is information indicating a change that is large enough to satisfy the first selecting condition, a first point corresponding to the inter-frame change information, and the partial video image output unit determines the number of divided screens according to the number of scenes corresponding to the number of the first points and simultaneously reproduces two or more partial video images respectively corresponding to all scenes that are segmented by one or two first points, on divided screens in a number that matches the number of divided screens.

Furthermore, in this program, it is preferable to cause the computer to function such that the accepting unit accepts selection of one partial video image from among two or more partial video images that are output by the partial video image output unit, and the partial video image output unit outputs a divided screen corresponding to one partial video image corresponding to the selection accepted by the accepting unit, in an emphasized manner, compared with a divided screen corresponding to another partial video image.

Furthermore, in this program, it is preferable to cause the computer to further function as: a partial video image acquiring unit that acquires one or at least two partial video images corresponding to selection of a scene or selection of a partial video image accepted by the accepting unit; and an accumulating unit that accumulates a digest video image having one or more partial video images acquired by the partial video image acquiring unit.

Figure 21:
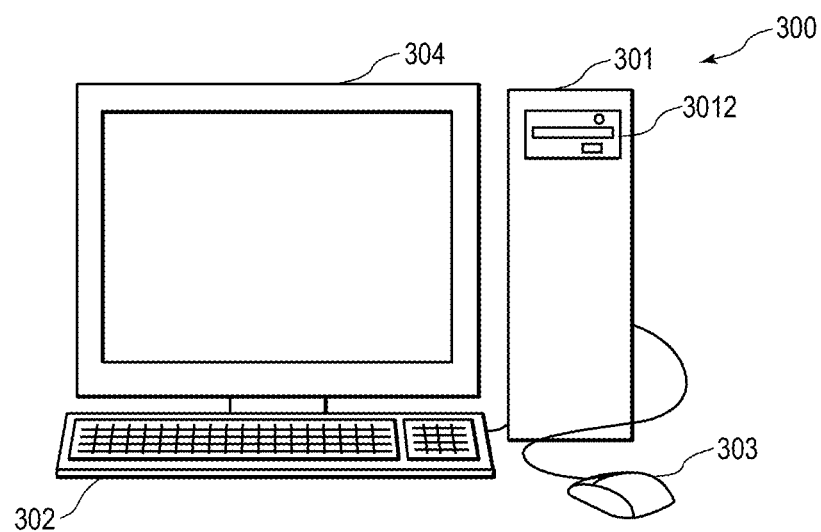
FIG. 21 is a schematic view of a computer system in the foregoing embodiments.
Figure 22:
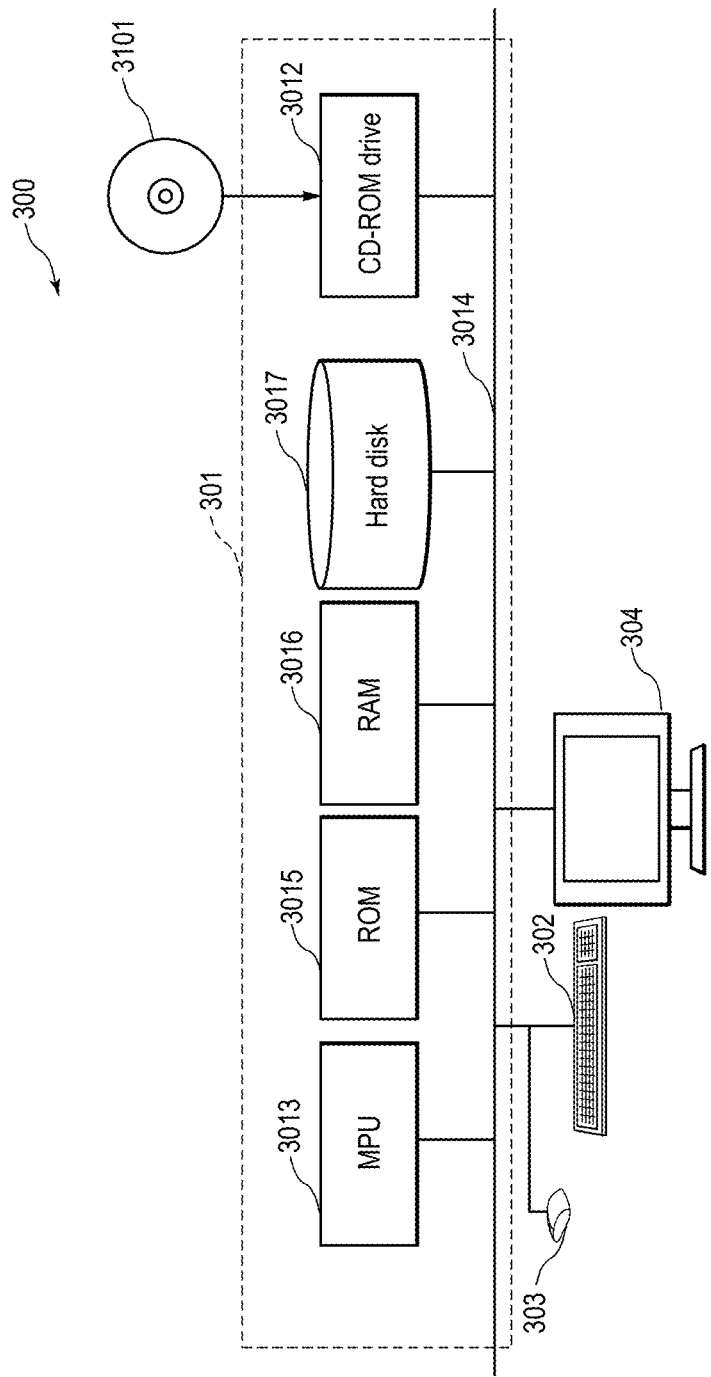
FIG. 22 is a block diagram of the computer system in the embodiments.

FIG. 21 shows the external appearance of a computer that executes the programs described in this specification to realize the video image processing apparatus 2 and the like in the foregoing various embodiments. The foregoing embodiments may be realized using computer hardware and a computer program executed thereon. FIG. 21 is a schematic view of a computer system 300. FIG. 22 is a block diagram of the system 300.

In FIG. 21, the computer system 300 includes a computer 301 including a CD-ROM drive, a keyboard 302, a mouse 303, and a monitor 304.

In FIG. 22, the computer 301 includes not only the CD-ROM drive 3012, but also an MPU 3013, a bus 3014 connected to the CD-ROM drive 3012 and the like, a ROM 3015 in which a program such as a boot up program is to be stored, a RAM 3016 that is connected to the MPU 3013 and is a memory in which a command of an application program is temporarily stored and a temporary storage area is provided, and a hard disk 3017 in which an application program, a system program, and data are to be stored. Although not shown, the computer 301 may further include a network card that provides connection to a LAN.

The program for causing the computer system 300 to execute the functions of the video image processing apparatus 2 and the like in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system (OS) or a third party program to cause the computer 301 to execute the functions of the video image processing apparatus 2 and the like in the foregoing embodiments. The program may only include a command portion to call an appropriate function (module) in a controlled mode and obtain desired results. The manner in which the computer system 300 operates is well known, and thus a detailed description thereof has been omitted.

It should be noted that, in the program, in a step of transmitting information, a step of receiving information, or the like, processing that is performed by hardware, for example, processing performed by a modem or an interface card in the transmitting step (processing that can be performed only by hardware) is not included.

Furthermore, the computer that executes this program may be a single computer, or may be multiple computers. That is to say, centralized processing may be performed, or distributed processing may be performed.

Furthermore, in the foregoing embodiments, it will be appreciated that two or more communication parts in one apparatus may be physically realized by one medium.

In the foregoing embodiments, each process may be realized as centralized processing using a single apparatus, or may be realized as distributed processing using multiple apparatuses.

The present invention is not limited to the embodiment set forth herein. Various modifications are possible within the scope of the present invention.

INDUSTRIAL APPLICABILITY

As described above, the video image processing apparatus according to the present invention has an effect that it is possible to clearly indicate a scene switching point as appropriate, and thus this apparatus is useful, for example, as a video image editing apparatus and the like.

The invention claimed is:

1. A video image processing apparatus comprising:
a change information acquiring unit that acquires inter-frame change information, which is information indicating a change between two or more frames, among two or more frames constituting a video image;
a point determining unit that, in a case where the inter-frame change information is information indicating a change that is large enough to satisfy a predetermined condition, determines a first point corresponding to the inter-frame change information;
a point output unit that outputs a point in the video image that is the first point determined by the point determining unit, in a visually recognizable manner; and
an accepting unit that accepts a first selecting condition related to the predetermined condition, wherein:
the point determining unit determines, in a case where the inter-frame change information is information indicating a change that is large enough to satisfy the first selecting condition, a first point corresponding to the inter-frame change information,
the accepting unit accepts selection of one scene from among two or more scenes that are segmented by one or two first points output by the point output unit, and
the point output unit outputs display corresponding to one scene corresponding to the selection accepted by the accepting unit, in an emphasized manner, compared with display corresponding to another scene, and
the video image processing apparatus further comprises a partial video image output unit that outputs a partial video image comprising one scene corresponding to the selection accepted by the accepting unit.

2. The video image processing apparatus according to claim 1, wherein the change information acquiring unit acquires two or more feature values related to a change between two frames, and acquires inter-frame change information, using the two or more feature values.

3. The video image processing apparatus according to claim 2, further comprising:
an accepting unit that accepts a first selecting condition related to the predetermined condition,
wherein the point determining unit determines, in a case where the inter-frame change information is information indicating a change that is large enough to satisfy the first selecting condition, a first point corresponding to the inter-frame change information.

4. The video image processing apparatus according to claim 3,
wherein the accepting unit accepts selection of one scene from among two or more scenes that are segmented by one or two first points output by the point output unit, and
the point output unit outputs display corresponding to one scene corresponding to the selection accepted by the accepting unit, in an emphasized manner, compared with display corresponding to another scene.

5. The video image processing apparatus according to claim 3, further comprising: a partial video image output unit that outputs a partial video image comprising one scene corresponding to the selection accepted by the accepting unit.

6. The video image processing apparatus according to claim 1, further comprising:
a partial video image acquiring unit that acquires one or at least two partial video images corresponding to accepted selection of a scene or a partial video image; and
an accumulating unit that accumulates a digest video image having one or more partial video images acquired by the partial video image acquiring unit.

7. A video image processing apparatus comprising:
a change information acquiring unit that acquires inter-frame change information, which is information indicating a change between two or more frames, among two or more frames constituting a video image;
a point determining unit that, in a case where the inter-frame change information is information indicating a change that is large enough to satisfy a predetermined condition, determines a first point corresponding to the inter-frame change information;
a partial video image output unit that simultaneously reproduces two or more partial video images respectively on divided screens which are regions divided in a screen; and
an accepting unit that accepts a first selecting condition related to the predetermined condition, wherein:
the point determining unit determines, in a case where the inter-frame change information is information indicating a change that is large enough to satisfy the first selecting condition, a first point corresponding to the inter-frame change information, and
the two or more partial video images respectively comprise two or more scenes that are segmented by one or two first points according to the number of scenes that corresponds to the number of the one or two first points.

8. The video image processing apparatus according to claim 7,
wherein the accepting unit accepts selection of one partial video image from among two or more partial video images that are output by the partial video image output unit, and
the partial video image output unit outputs a divided screen corresponding to one partial video image corresponding to the selection accepted by the accepting unit, in an emphasized manner, compared with a divided screen corresponding to another partial video image.

9. A video image processing method realized by a change information acquiring unit, a point determining unit, and a point output unit, comprising:
a change information acquiring step of the change information acquiring unit acquiring inter-frame change information, which is information indicating a change between two or more frames, among two or more frames constituting a video image;
a point determining step of the point determining unit determining, in a case where the inter-frame change information is information indicating a change that is large enough to satisfy a predetermined condition, a first point corresponding to the inter-frame change information;

a point output step of the point output unit outputting a point in the video image that is the first point determined in the point determining step, in a visually recognizable manner; and an accepting step of an accepting unit accepting a first selecting condition related to the predetermined condition, wherein:

the point determining unit determines, in a case where the inter-frame change information is information indicating a change that is large enough to satisfy the first selecting condition, a first point corresponding to the inter-frame change information, the accepting unit accepts selection of one scene from among two or more scenes that are segmented by one or two first points output by the point output unit, and the point output unit outputs display corresponding to one scene corresponding to the selection accepted by the accepting unit, in an emphasized manner, compared with display corresponding to another scene, and the video image processing apparatus further comprises a partial video image output unit that outputs a partial video image comprising one scene corresponding to the selection accepted by the accepting unit.

10. A video image processing method realized by a change information acquiring unit, a point determining unit, and a partial video image output unit, comprising:

a change information acquiring step of the change information acquiring unit acquiring inter-frame change information, which is information indicating a change between two or more frames, among two or more frames constituting a video image;

a point determining step of the point determining unit determining, in a case where the inter-frame change information is information indicating a change that is large enough to satisfy a predetermined condition, a first point corresponding to the inter-frame change information;

a partial video image output step of the partial video image output unit simultaneously reproducing two or more partial video images respectively on divided screens which are regions divided in a screen; and an accepting step of an accepting unit accepting a first selecting condition related to the predetermined condition, wherein:

the point determining unit determines, in a case where the inter-frame change information is information indicating a change that is large enough to satisfy the first selecting condition, a first point corresponding to the inter-frame change information, and the two or more partial video images respectively comprise two or more scenes that are segmented by one or two first points according to the number of scenes that corresponds to the number of the one or two first points.

* * * * *